United States Patent
Myung et al.

(10) Patent No.: US 12,250,718 B2
(45) Date of Patent: *Mar. 11, 2025

(54) METHOD OF PERFORMING CHANNEL ACCESS PROCEDURE AND APPARATUS THEREFOR

(71) Applicant: LG ELECTRONICS INC., Seoul (KR)

(72) Inventors: Sechang Myung, Seoul (KR); Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

This patent is subject to a terminal disclaimer.

(21) Appl. No.: 17/753,842

(22) PCT Filed: Jan. 10, 2022

(86) PCT No.: PCT/KR2022/000381
§ 371 (c)(1),
(2) Date: Mar. 16, 2022

(87) PCT Pub. No.: WO2022/154406
PCT Pub. Date: Jul. 21, 2022

(65) Prior Publication Data
US 2023/0164839 A1    May 25, 2023

(30) Foreign Application Priority Data

Jan. 15, 2021 (KR) .......... 10-2021-0005779
Apr. 13, 2021 (KR) .......... 10-2021-0047925

(51) Int. Cl.
H04W 74/0808    (2024.01)
H04W 74/00    (2009.01)
(Continued)

(52) U.S. Cl.
CPC ..... *H04W 74/0808* (2013.01); *H04W 74/004* (2013.01); *H04W 74/0816* (2013.01); *H04W 74/0866* (2013.01)

(58) Field of Classification Search
CPC .......... H04B 7/0404; H04B 7/0695; H04B 7/06966; H04W 74/004; H04W 74/0808; H04W 74/0816; H04W 74/0866
See application file for complete search history.

(56) References Cited

U.S. PATENT DOCUMENTS 11,778,662 B2 * 10/2023 Myung ................ H04B 7/0404
  370/329
2018/0206269 A1    7/2018 Bhorkar et al.
(Continued)

FOREIGN PATENT DOCUMENTS

| CN | 110326243 | 10/2019 |
|----|-----------|---------|
| CN | 111149413 | 5/2020  |

(Continued)

OTHER PUBLICATIONS

PCT International Application No. PCT/KR2022/000381, International Search Report dated May 10, 2022, 3 pages.
(Continued)

*Primary Examiner* — Kashif Siddiqui
(74) *Attorney, Agent, or Firm* — LEE, HONG, DEGERMAN, KANG & WAIMEY

(57) ABSTRACT

Disclosed is a method of transmitting an uplink signal by a user equipment in a wireless communication system. The method includes receiving first information related to an uplink (UL) transmission beam, determining a listen-before-talk (LBT) beam based on the first information, and transmitting the uplink signal through the UL transmission beam based on success of LBT based on the LBT beam.

10 Claims, 30 Drawing Sheets

(51) Int. Cl.
 *H04W 74/08* (2024.01)
 *H04W 74/0816* (2024.01)

(56) References Cited

U.S. PATENT DOCUMENTS

| | | | |
|---|---|---|---|
| 2019/0230706 A1 | 7/2019 | Li et al. | |
| 2019/0373635 A1* | 12/2019 | Yang | H04B 7/0408 |
| 2020/0053779 A1 | 2/2020 | Jeon et al. | |
| 2020/0154474 A1 | 5/2020 | Lo et al. | |
| 2020/0187250 A1 | 6/2020 | Bhattad et al. | |
| 2020/0252806 A1 | 8/2020 | Yerramalli et al. | |
| 2020/0252923 A1 | 8/2020 | Yerramalli et al. | |
| 2020/0260292 A1 | 8/2020 | Xue et al. | |
| 2020/0275485 A1 | 8/2020 | Babaei et al. | |
| 2020/0314903 A1 | 10/2020 | Jang et al. | |
| 2020/0336921 A1 | 10/2020 | Yerramalli et al. | |
| 2021/0203400 A1* | 7/2021 | Babaei | H04W 74/0816 |
| 2022/0377810 A1* | 11/2022 | Bhamri | H04B 7/06966 |
| 2023/0009559 A1* | 1/2023 | Wang | H04B 7/0695 |

FOREIGN PATENT DOCUMENTS

| | | |
|---|---|---|
| CN | 111480388 | 7/2020 |
| CN | 111699748 | 9/2020 |
| EP | 3609284 | 12/2020 |
| JP | 2020-536453 | 12/2020 |
| KR | 10-2020-0029671 | 3/2020 |
| KR | 10-2020-0051636 | 5/2020 |
| KR | 10-2020-0090949 | 7/2020 |
| KR | 10-2020-0133256 | 11/2020 |
| WO | 2019-195465 | 10/2019 |
| WO | 2019-210185 | 10/2019 |
| WO | 2020162717 | 8/2020 |

OTHER PUBLICATIONS

Moderator (Qualcomm Incorporated), "FL summary for channel access mechanism for 52.6GHZ-71GHz band, ver 08," R1-2009675, 3GPP TSG RAN WG1 Meeting #103-e, Nov. 2020, 111 pages.
Huawei et al., "Remaining issue on handling UL LBT failure," R2-2000957, 3GPP TSG-RAN WG2 eMeeting 109, Mar. 2020, 5 pages.
Interdigital, Inc., "On Channel access mechanisms," R1-2006453, 3GPP TSG RAN WG1 #102-e, Aug. 2020, 6 pages.
Catt, "Channel Access Mechanism in support," R1-2007848, 3GPP TSG RAN WG1 #103-e, Nov. 2020, 10 pages.
European Patent Office Application Serial No. 22739601.7, Search Report dated Jun. 28, 2023, 9 pages.
Korean Intellectual Property Office Application No. 10-2022-7015653, Office Action dated Jul. 28, 2023, 4 pages.
ZTE, "TCT state switching under NR-U," R4-2007143, 3GPP TSG-RAN WG4 Meeting #95-e, Electronic Meeting, Jun. 2020, 3 pages.
Japan Patent Office Application No. 2022-531539, Office Action dated Apr. 18, 2023, 7 pages.
Interdigital, Inc., "On Channel access mechanisms," 3GPP TSG RAN WG1 #103-e, e-Meeting, R1-2007791, Nov. 2020, 6 pages.
Lenovo, et al., "Discussion on physical layer impacts for NR beyond 52.6 GHz," 3GPP TSG RAN WG1 #103-e, e-meeting, R1-2007558, Nov. 2020, 21 pages.
Oppo, "UL BWP switching upon RACH for NR-U," 3GPP TSG-RAN WG2 Meeting #103, R2-1811066, Aug. 2018, 4 pages.
Korean Intellectual Property Office Application No. 10-2022-7015653, Prior Art Search Report dated Nov. 8, 2022, 6 pages.
The State Intellectual Property Office of the People's Republic of China Application Serial No. 202280003418.0, Office Action dated Apr. 30, 2024, 9 pages.
Ericsson, "Handling consistent UL LBT failures", R2-2001207, 3GPP TSG-RAN WG2 #109-e, Mar. 2020, 15 pages.
The State Intellectual Property Office of the People's Republic of China Application Serial No. 202280003418.0, Office Action dated Oct. 31, 2024, 8 pages.
InterDigital Inc., "On LBT for Beam-Based Transmission for NR-U", R1-1804885, 3GPP TSG RAN WG1 Meeting #92bis, Apr. 2018, 6 pages.

* cited by examiner

FIG. 7
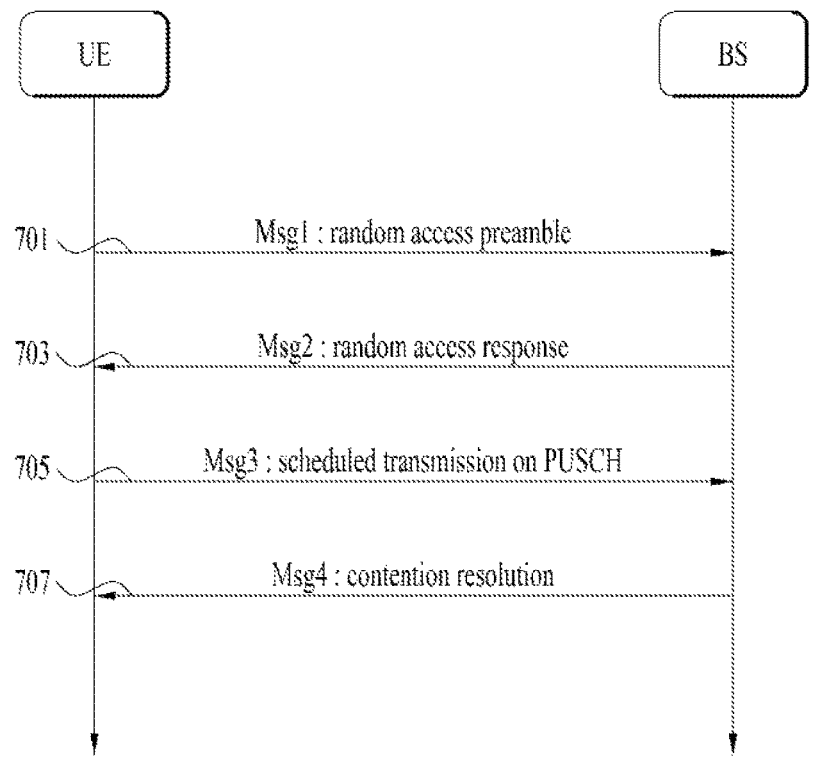
(a)
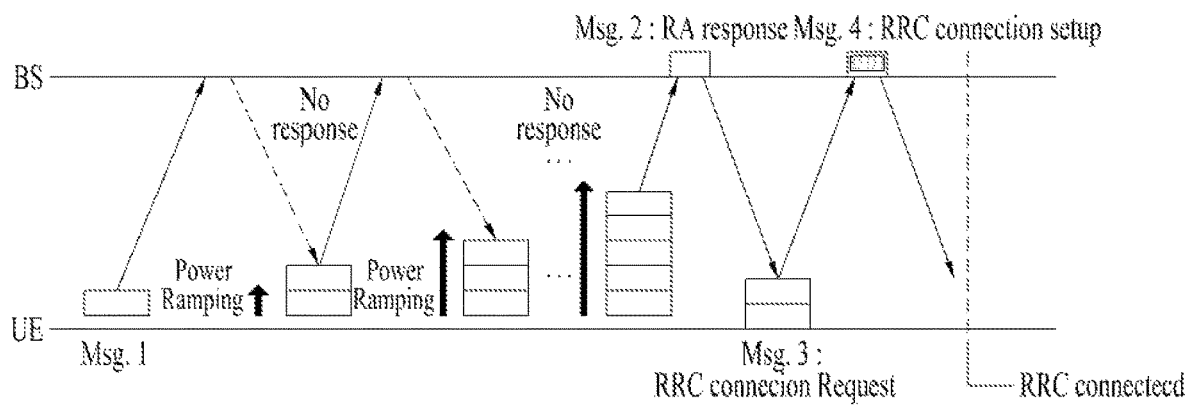
(b)

(a) Uplink Tx procedure based on dynamic grant (b) Uplink Tx procedure based on configured grant

FIG. 14
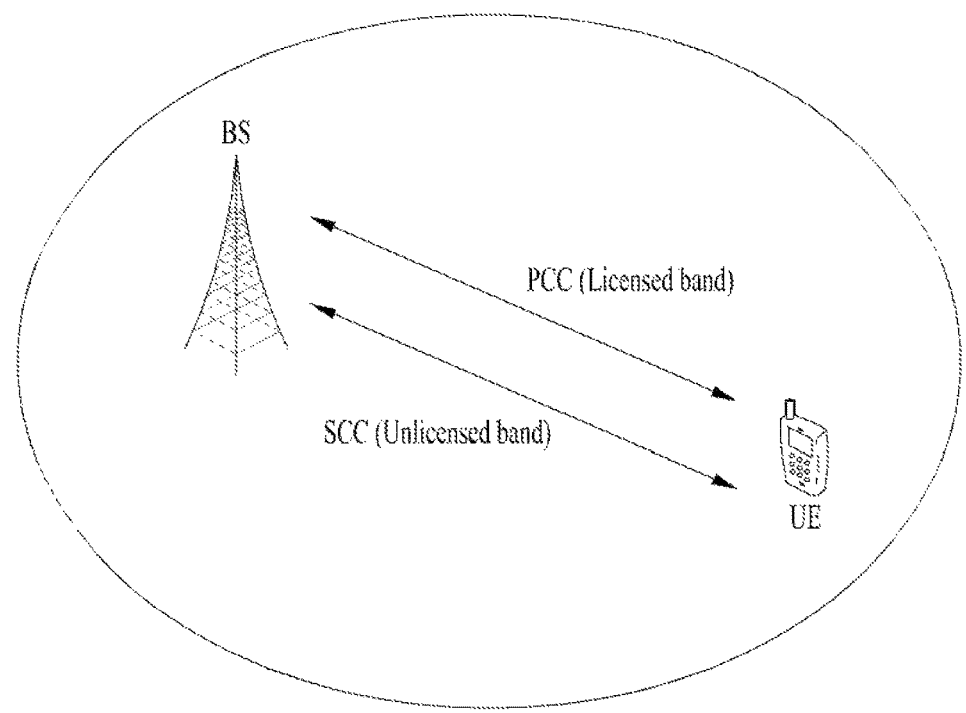
(a) Carrier aggregation between L-band and U-band
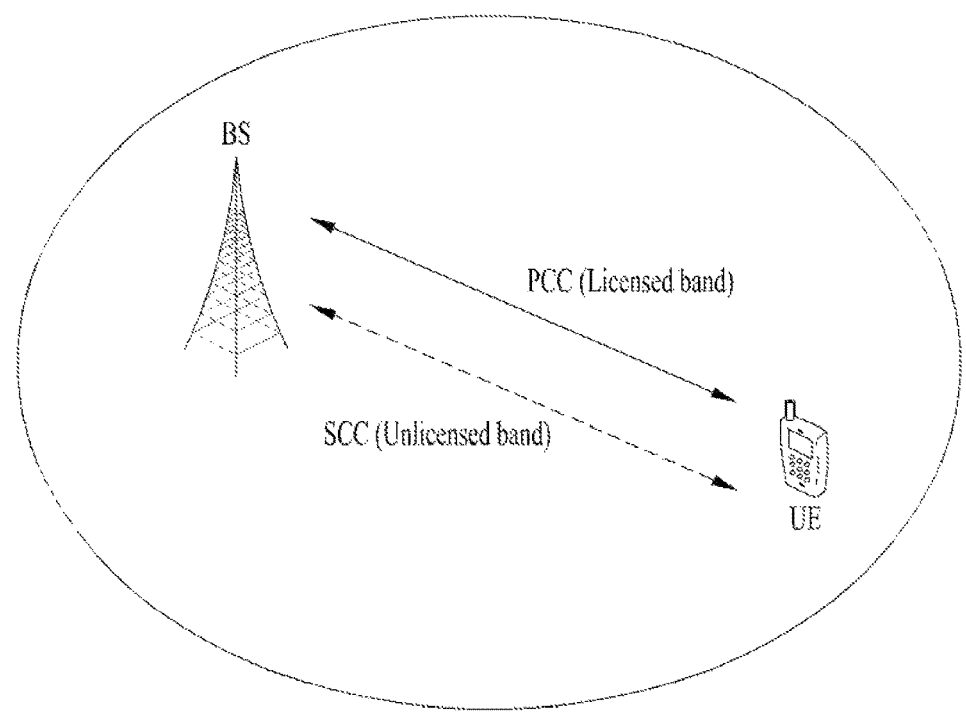
(b) Standalone U-band(s)

METHOD OF PERFORMING CHANNEL ACCESS PROCEDURE AND APPARATUS THEREFOR

CROSS-REFERENCE TO RELATED APPLICATIONS

This application is the National Stage filing under 35 U.S.C. 371 of International Application No. PCT/KR2022/000381, filed on Jan. 10, 2022, which claims the benefit of earlier filing date and right of priority to Korean Application Nos. 10-2021-0005779, filed on Jan. 15, 2021 and 10-2021-0047925, filed on Apr. 13, 2021, the contents of which are all hereby incorporated by reference herein in their entireties.

TECHNICAL FIELD

The present disclosure relates to a method of performing a channel access procedure and an apparatus therefor and, more particularly, to a method of configuring a listen-before-talk (LBT) beam for performing directional-LBT for a user equipment, and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method of performing a channel access procedure and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided is a method of transmitting an uplink signal by a user equipment (UE) in a wireless communication system, including receiving first information related to an uplink (UL) transmission beam, determining a listen-before-talk (LBT) beam based on the first information, and transmitting the uplink signal through the UL transmission beam based on success of LBT based on the LBT beam.

The LBT beam may include the UL transmission beam.

The LBT beam may include the UL transmission beam based on reception of second information related to the LBT beam, and an area of the LBT beam may be larger than an area of the UL transmission beam.

The LBT beam may be identical to the UL transmission beam based on non-reception of second information related to the LBT beam.

The LBT beam may be redetermined based on failure of LBT performed M1 times, M1 being a positive integer.

A UL bandwidth part (BWP) may be switched based on failure of LBT performed M1 times based on the redetermined LBT beam.

In another aspect of the present disclosure, provided herein is a user equipment (UE) for transmitting an uplink signal in a wireless communication system, including at least one transceiver; at least one processor; and at least one memory operably connected to the at least one processor and configured to store instructions causing, when executed, the at least one processor to perform operations. The operations include receiving first information related to an uplink (UL) transmission beam through the at least one transceiver, determining a listen-before-talk (LBT) beam based on the first information, and transmitting, through the at least one transceiver, the uplink signal through the UL transmission beam based on success of LBT based on the LBT beam.

The LBT beam may include the UL transmission beam.

The LBT beam may include the UL transmission beam based on reception of second information related to the LBT beam, and an area of the LBT beam may be larger than an area of the UL transmission beam.

The LBT beam may be identical to the UL transmission beam based on non-reception of second information related to the LBT beam.

The LBT beam may be redetermined based on failure of LBT performed M1 times, M1 being a positive integer.

A UL bandwidth part (BWP) may be switched based on failure of LBT performed M1 times based on the redetermined LBT beam.

In another aspect of the present disclosure, provided herein is an apparatus for transmitting an uplink signal in a wireless communication system, including at least one processor; and at least one memory operably connected to the at least one processor and configured to store instructions causing, when executed, the at least one processor to perform an operation. The operation includes receiving first information related to an uplink (UL) transmission beam, determining a listen-before-talk (LBT) beam based on the first information, and transmitting the uplink signal through the UL transmission beam based on success of LBT based on the LBT beam.

In another aspect of the present disclosure, provided herein is a computer-readable storage medium including at least one computer program causing at least one processor to perform an operation. The operation includes receiving first information related to an uplink (UL) transmission beam, determining a listen-before-talk (LBT) beam based on the first information, and transmitting an uplink signal through the UL transmission beam based on success of LBT based on the LBT beam.

In another aspect of the present disclosure, provided herein is a method of receiving an uplink signal by a base station (BS) in a wireless communication system, including transmitting first information related to an uplink (UL)

transmission beam, and receiving the uplink signal through the UL transmission beam. A listen-before-talk (LBT) beam for the UL signal may be determined based on the UL transmission beam.

In another aspect of the present disclosure, provided herein is a base station (BS) for receiving an uplink signal in a wireless communication system, including at least one transceiver; at least one processor; and at least one memory operably connected to the at least one processor and configured to store instructions causing, when executed, the at least one processor to perform an operation. The operation includes transmitting first information related to an uplink (UL) transmission beam through the at least one transceiver, and receiving, through the at least one transceiver, the uplink signal through the UL transmission beam. A listen-before-talk (LBT) beam for the uplink signal may be determined based on the UL transmission beam.

Advantageous Effects

According to the present disclosure, a base station (BS) may effectively configure an LBT beam through which a user equipment (UE) will perform LBT according to a mode of the UE (e.g., an idle/inactive mode or a connected mode).

The UE may perform efficient LBT according to the mode of the UE using the LBT beam configured by the BS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 7 is a diagram illustrating an exemplary 4-step RACH procedure;

FIG. 14 illustrates a wireless communication system supporting an unlicensed band;

BEST MODE

Figure 1:
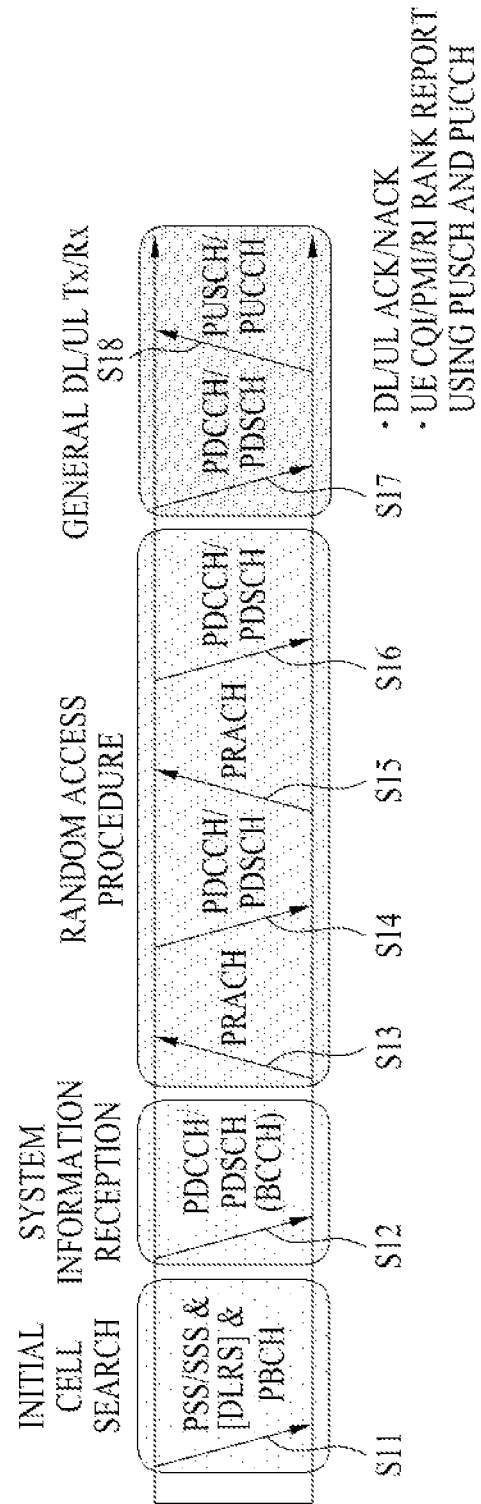
FIG. 1 illustrates physical channels and a general signal transmission method using the physical channels in a 3$^{rd}$ generation partnership project (3GPP) system as an exemplary wireless communication system.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3$^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below. Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
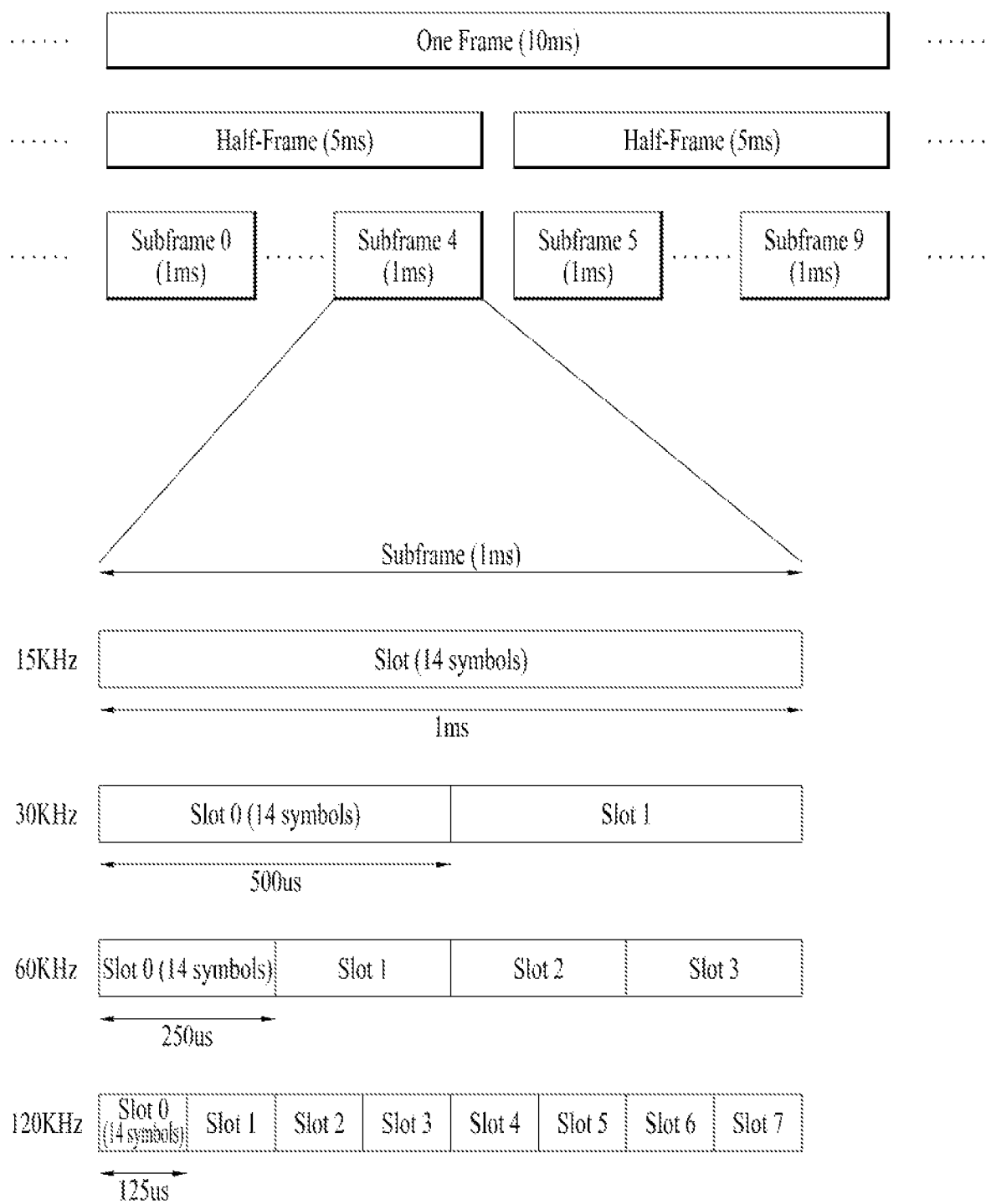
FIGS. 2, 3 and 4 are diagrams illustrating structures of a radio frame and slots used in a new RAT (NR) system.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. In NR, various numerologies (or SCSs) may be supported to support various 5$^{th}$ generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
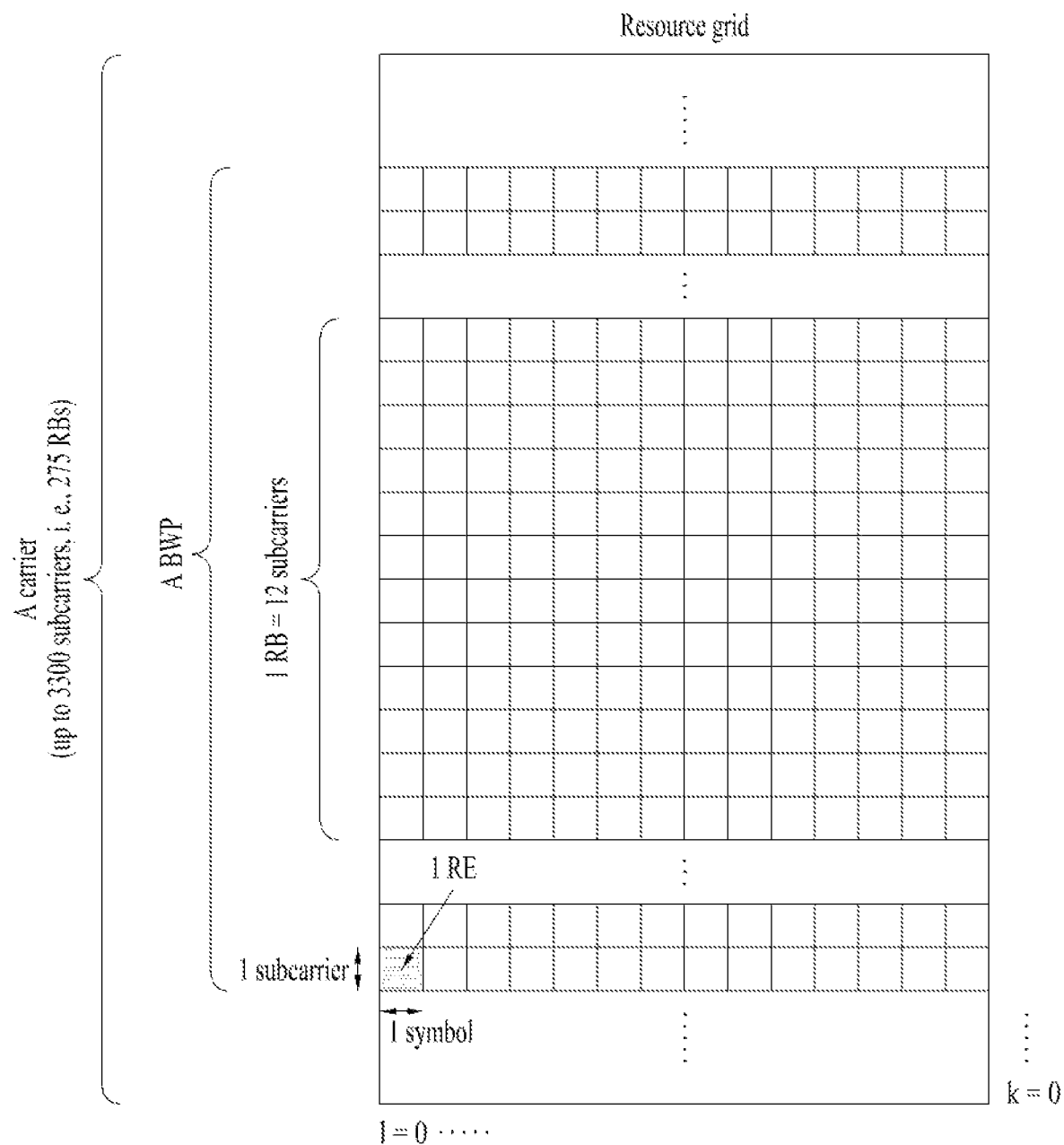
Figure 4:
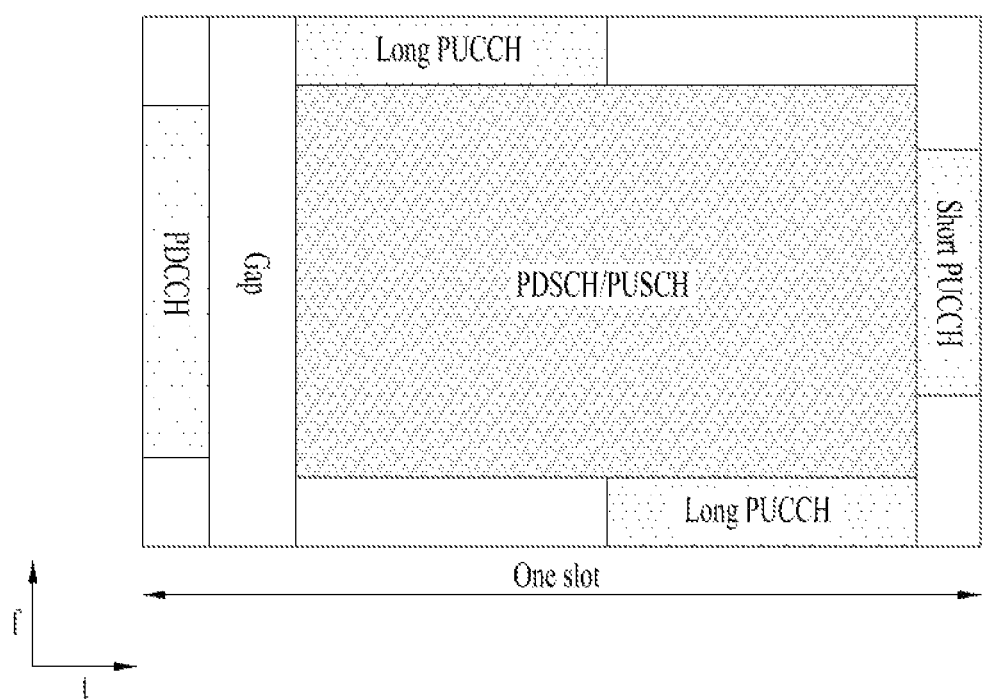

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped. FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
|---|---|---|---|
| Type0-PDCCH | Common | SI-RNTI on a primary cell | SIB Decoding |
| Type0A- | Common | SI-RNTI on a primary cell | SIB |

TABLE 4-continued

| Type | Search Space | RNTI | Use Case |
|---|---|---|---|
| Type1-PDCCH | Common | RA-RNTI or TC-RNTI on a primary cell | PDCCH Decoding Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI,or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.—searchSpaceId: indicates the ID of the SS set.—controlResourceSetId: indicates a CORESET associated with the SS set.

- monitoringSlotPeriodicityAndOffset: indicates a PDCCH monitoring periodicity (in slots) and a PDCCH monitoring offset (in slots).
- monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.
- nrofCandidates: indicates the number of PDCCH candidates (e.g., one of 0, 1, 2, 3, 4, 5, 6, and 8) for each AL={1, 2, 4, 8, 16}.
- searchSpaceType: indicates whether the SS type is CSS or USS.
- DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 5-continued

| DCI format | Usage |
|---|---|
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.

SR: information used to request UL-SCH resources.

HARQ-ACK: a response to a DL data packet (e.g., codeword) on the PDSCH.

An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)). PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBs, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

System Information Acquisition

Figure 5:
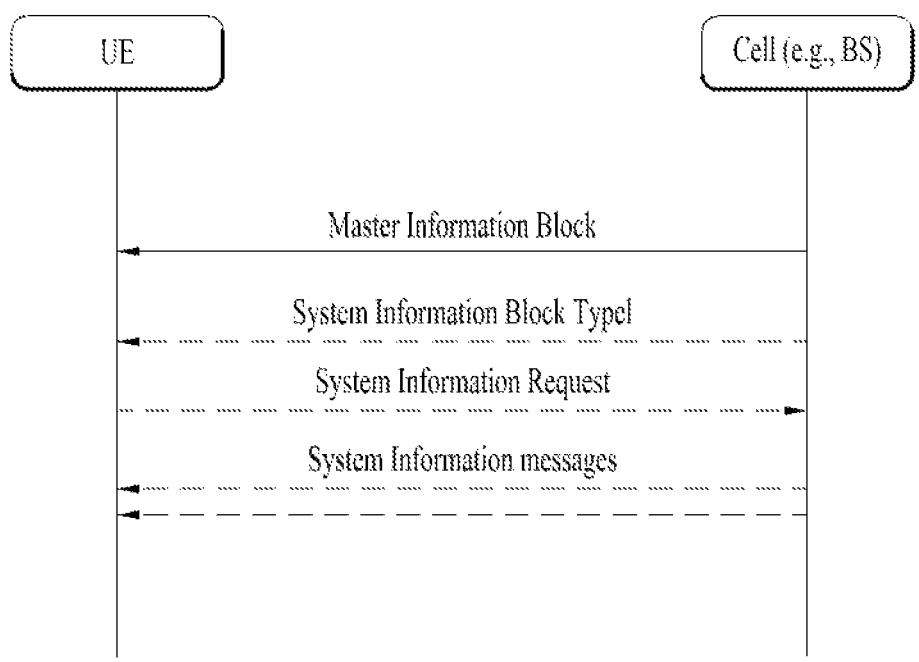
FIGS. 5 and 6 are diagrams illustrating the composition of a synchronization signal/physical broadcast channel (SS/PBCH) block and a method of transmitting an SS/PBCH block.

FIG. 5 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to obtain the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIB s (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Beam Alignment

Figure 6:
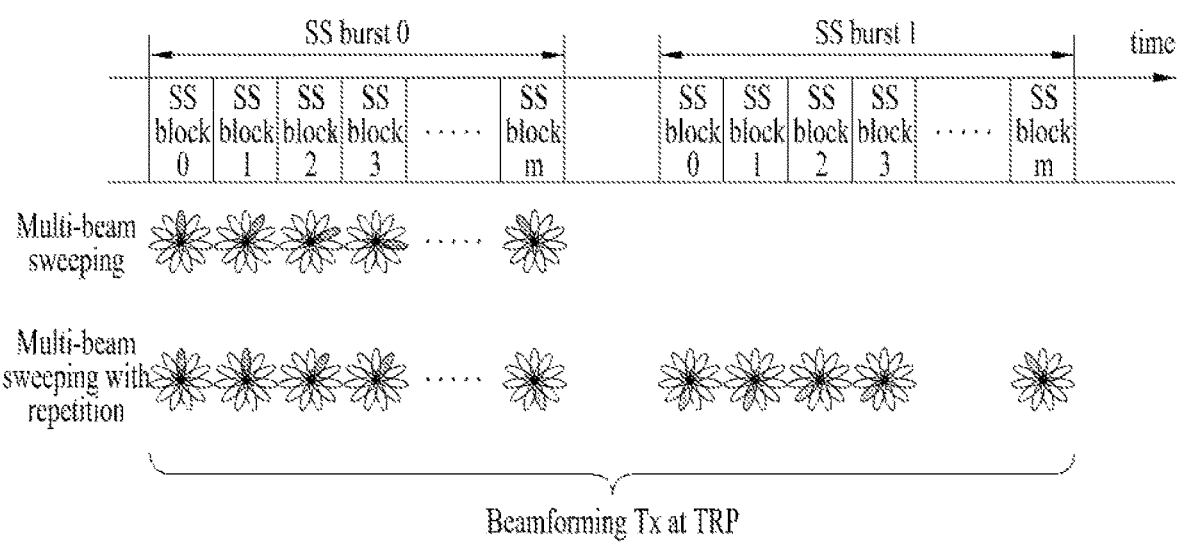

FIG. 6 illustrates exemplary multi-beam transmission of SSBs.

Figure 10:
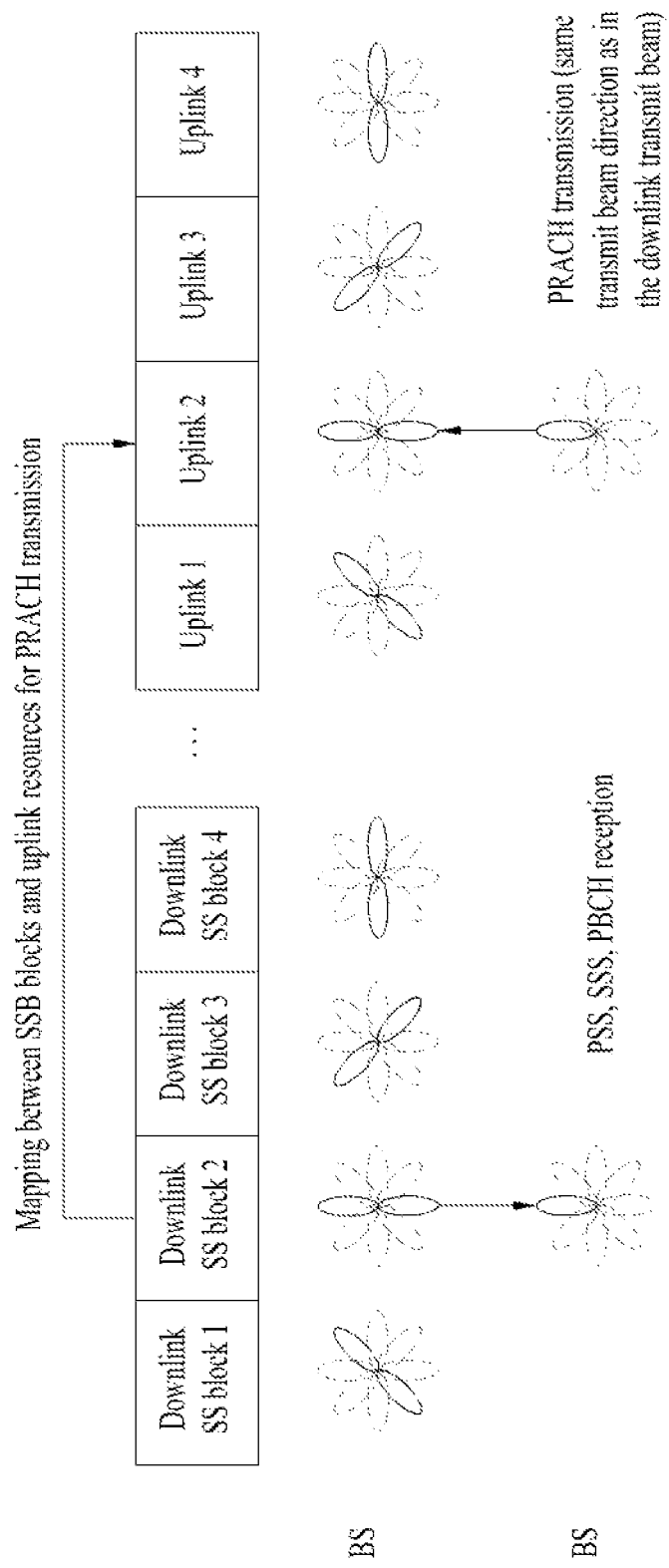
FIGS. 10 and 11 are diagrams illustrating transmission of synchronization signal blocks (SSBs) and physical random access channel (PRACH) resources linked to the SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Random Access Channel (RACH) Procedure

When a UE first accesses a BS or has no radio resource for signal transmission, the UE may perform a RACH procedure upon the BS.

The RACH procedure may be used for various purposes. For example, the RACH procedure may be used for initial network access from RRC_IDLE, an RRC connection re-establishment procedure, handover, UE-triggered UL data transmission, transition from RRC_INACTIVE, time alignment establishment in SCell addition, other system information (OSI) request and beam failure recovery, and so on. The UE may acquire UL synchronization and UL transmission resources from the RACH procedure.

The RACH procedure may be divided into a contention-based RACH procedure and a contention-free RACH procedure. The contention-based RACH procedure may be divided into a 4-step RACH procedure (4-step RACH) and a 2-step RACH procedure (2-step RACH).

(1) 4-Step RACH: Type-1 Random Access Procedure

FIG. 7 is a diagram illustrating an exemplary 4-step RACH procedure.

If the (contention-based) RACH procedure is performed in four steps (i.e., 4-step RACH procedure), the UE may transmit a message (message 1 (Msg1)) including a preamble related to a specific sequence on a physical random access channel (PRACH) (701) and may receive a response message (random access response (RAR) message) (message 2 (Msg2)) to the preamble on a PDCCH and a PDSCH related thereto (703). The UE may transmit a message (message 3 (Msg3)) including a PUSCH based on scheduling information in the RAR (705). The UE may perform a contention resolution procedure by receiving a PDCCH signal and a PDSCH signal related thereto. To this end, the UE may receive a message (message 4 (Msg4)) containing contention resolution information on the contention resolution procedure from the BS (707).

The 4-step RACH procedure of the UE may be summarized as shown in Table 7 below.

TABLE 7

| Type of Signals | | Operations/Information obtained |
|---|---|---|
| 1st step | PRACH preamble in UL | * Initial beam obtainment<br>* Random selection of RA-preamble ID |

TABLE 7-continued

| Type of Signals | | Operations/Information obtained |
|---|---|---|
| 2nd step | Random Access Response on DL-SCH | * Timing Advanced information<br>* RA-preamble ID<br>* Initial UL grant, Temporary C-RNTI |
| 3rd step | UL transmission on UL-SCH | * RRC connection request<br>* UE identifier |
| 4th step | Contention Resolution on DL | * Temporary C-RNTI on PDCCH for initial access<br>* C-RNTI on PDCCH for UE in RRC_CONNECTED |

First, the UE may transmit a random access preamble over a PRACH in UL as Msg1 of the RACH procedure.

Random access preamble sequences of two different lengths are supported. Long sequence length 839 is applied with SCSs of 1.25 and 5 kHz, and short sequence length 139 is applied with SCSs of 15, 30, 60 and 120 kHz.

Multiple preamble formats are defined by one or more RACH OFDM symbols and different cyclic prefixes (and/or guard times). The RACH configuration for the initial bandwidth of a primary cell (Pcell) may be included in system information of the cell and provided to the UE. The RACH configuration includes information on the SCS of the PRACH, available preambles, preamble formats, and the like. The RACH configuration includes information on association between SSBs and RACH (time-frequency) resources. The UE transmits the random access preamble on a RACH time-frequency resource associated with a detected or selected SSB.

The threshold of SSBs may be configured by the network for association with RACH resources. The RACH preamble may be transmitted or retransmitted based on SSB(s) having reference signal received power (RSRP) measured based thereon satisfying the threshold. For example, the UE may select one of the SSB(s) that satisfy the threshold and transmit or retransmit the RACH preamble based on a RACH resource associated with the selected SSB. For example, upon retransmission of the RACH preamble, the UE may reselect one of the SSB(s) and retransmit the RACH preamble based on a RACH resource associated with the reselected SSB. That is, the RACH resource for retransmission of the RACH preamble may be the same as and/or different from the RACH resource for transmission of the RACH preamble.

When the BS receives a random access preamble from the UE, the BS transmits an RAR message (Msg2) to the UE. A PDCCH scheduling a PDSCH carrying the RAR is cyclic redundancy check (CRC) scrambled with a random access (RA) radio network temporary identifier (RNTI) (RA-RNTI) and then transmitted. Upon detecting the PDCCH CRC-scrambled with the RA-RNTI, the UE may receive the RAR from the PDSCH scheduled by DCI carried on the PDCCH. The UE checks whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmission power for retransmitting the preamble based on the most recent transmission power, power increment, and power ramping counter.

The RAR information may include a preamble sequence transmitted by the UE, a temporary cell-RNTI (TC-RNTI) allocated by the BS to the UE that has attempted random access, and UL transmit time alignment information, UL transmission power adjustment information, and UL radio resource allocation information. If the UE receives the RAR information for itself on the PDSCH, the UE may obtain timing advance information for UL synchronization, an initial UL grant, a TC-RNTI. The timing advance information may be used to control a UL signal transmission timing. To better align PUSCH/PUCCH transmission by the UE with the subframe timing at the network, the network (e.g., BS) may obtain the timing advance information based on timing information detected from a PRACH preamble received from the UE and transmit the timing advance information to the UE. The UE may transmit a UL signal over a UL shared channel based on the RAR information as Msg3 of the RACH procedure. Msg3 may include an RRC connection request and a UE identifier. In response to Msg3, the network may transmit Msg4, which may be treated as a contention resolution message on DL. Upon receiving Msg4, the UE may enter the RRC_CONNECTED state.

As described above, a UL grant in the RAR may schedule PUSCH transmission to the BS. A PUSCH carrying initial UL transmission based on the UL grant in the RAR is also referred to as a Msg3 PUSCH. The content of an RAR UL grant may start at the MSB and end at the LSB, and the content may be given as shown in Table 8.

TABLE 8

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A TPC command is used to determine the transmission power of the Msg3 PUSCH. For example, the TPC command may be interpreted as shown in Table 9.

TABLE 9

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

(2) 2-Step RACH: Type-2 Random Access Procedure

Figure 8:
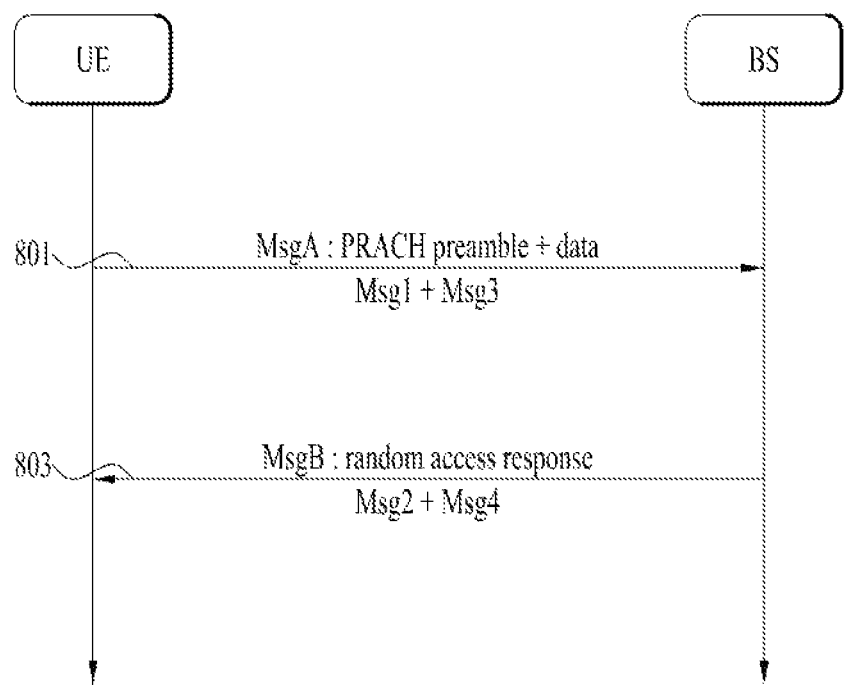
FIG. 8 is a diagram illustrating an exemplary 2-step RACH procedure.

FIG. 8 is a diagram illustrating an exemplary 2-step RACH procedure.

The 2-step RACH procedure in which the (contention-based) RACH procedure is performed in two steps has been proposed to simplify the RACH procedure, that is, to achieve low signaling overhead and low latency.

The operations of transmitting Msg1 and Msg3 in the 4-step RACH procedure may be performed as one operation in the 2-step RACH procedure where the UE transmits one message (message A (MsgA)) including a PRACH and a PUSCH. The operations in which the BS transmits Msg2 and Msg4 in the 4-step RACH procedure may be performed as one operation in the 2-step RACH procedure where the BS transmits one message (message B (MsgB)) including an RAR and contention resolution information.

That is, in the 2-step RACH procedure, the UE may combine Msg1 and Msg3 of the 4-step RACH procedure into one message (e.g., MsgA) and transmit the one message to the BS (801).

In addition, in the 2-step RACH procedure, the BS may combine Msg2 and Msg4 of the 4-step RACH procedure into one message (e.g., MsgB) and transmit the one message to the UE (S803).

Based on the combination of these messages, the 2-step RACH procedure may provide a low-latency RACH procedure.

Specifically, MsgA of the 2-step RACH procedure may include a PRACH preamble contained in Msg1 and data contained in Msg3. MsgB of the 2-step RACH procedure may include an RAR contained in Msg2 and contention resolution information contained in Msg4.

(3) Contention-Free RACH

Figure 9:
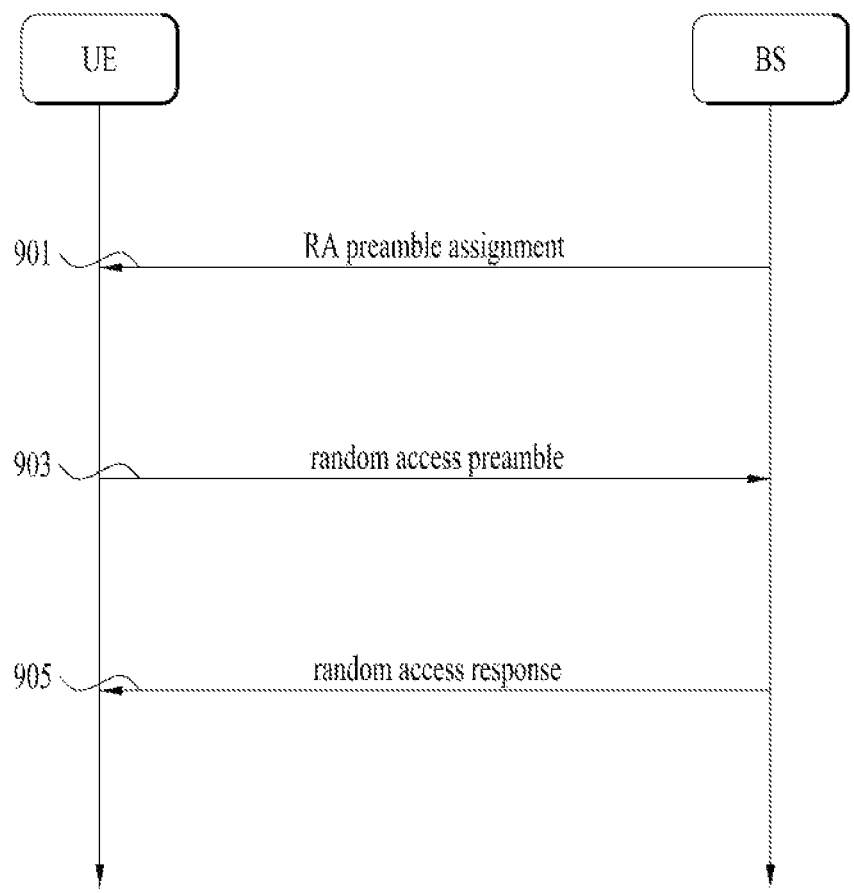
FIG. 9 is a diagram illustrating an exemplary contention-free RACH procedure.

FIG. 9 is a diagram illustrating an exemplary contention-free RACH procedure.

The contention-free RACH procedure may be used when the UE is handed over to another cell or BS or when requested by a command from the BS. The basic steps of the contention-free RACH procedure are similar to those of the contention-based RACH procedure. However, in the contention-free RACH procedure, the BS allocates a preamble to be used by the UE (hereinafter, dedicated random access preamble) to the UE (901), unlike the contention-based RACH procedure in which the UE arbitrarily selects a preamble to be used from among a plurality of random access preambles. Information on the dedicated random access preamble may be included in an RRC message (e.g., handover command) or provided to the UE through a PDCCH order. When the RACH procedure is initiated, the UE transmits the dedicated random access preamble to the BS (903). When the UE receives an RAR from the BS, the RACH procedure is completed (905).

In the contention-free RACH procedure, a CSI request field in an RAR UL grant indicates whether the UE includes an aperiodic CSI report in corresponding PUSCH transmission. The SCS for Msg3 PUSCH transmission is provided by an RRC parameter. The UE may transmit a PRACH and a Msg3 PUSCH on the same UL carrier of the same serving cell. The UL BWP for Msg3 PUSCH transmission is indicated by system information block 1 (SIB1).

(4) Mapping Between SSBs and PRACH Resources (Occasions)

Figure 11:
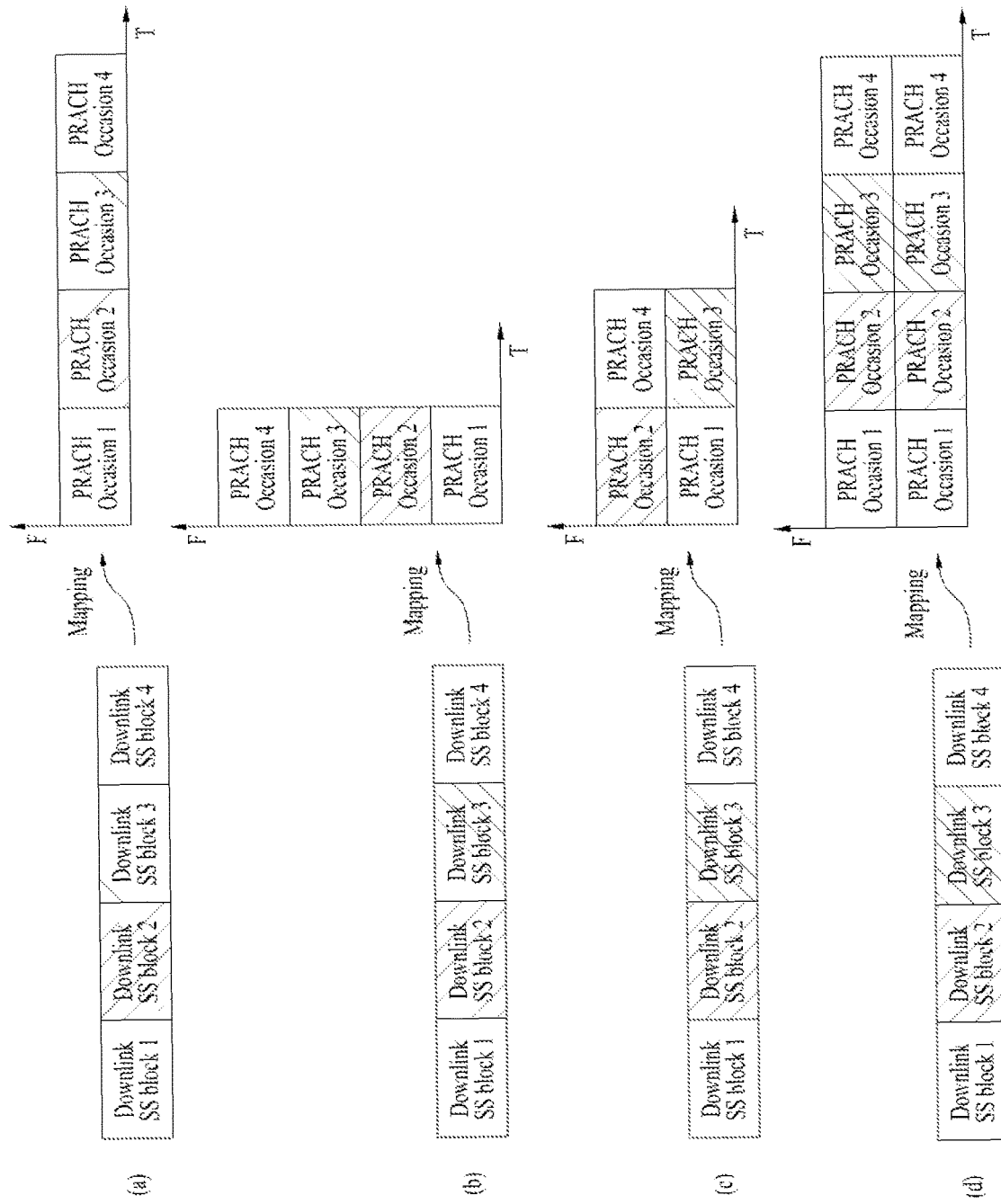

FIGS. 10 and 11 are diagrams illustrating transmission of SSBs and PRACH resources linked to the SSBs according to various embodiments of the present disclosure.

To communicate with one UE, the BS may need to find out what is the optimal beam direction between the BS and UE. Since it is expected that the optimal beam direction will vary according to the movement of the UE, the BS needs to continuously track the optimal beam direction. A process of finding out the optimal beam direction between the BS and UE is called a beam acquisition process, and a process of continuously tracking the optimal beam direction between the BS and UE is called a beam tracking process. The beam acquisition process may be required in the following cases: 1) initial access where the UE attempts to access the BS for the first time; 2) handover where the UE is handed over from one BS to another BS; and 3) beam recovery for recovering beam failure. The beam failure means a state in which while performing the beam tracking to find out the optimal beam between the UE and BS, the UE loses the optimal beam and thus is incapable of maintaining the optimal communication state with the BS or incapable of communicating with the BS.

In the NR system, a multi-stage beam acquisition process is being discussed for beam acquisition in an environment using multiple beams. In the multi-stage beam acquisition process, the BS and UE perform a connection setup by using a wide beam in the initial access stage. After the connection setup is completed, the BS and UE perform the highest quality of communication by using a narrow beam. The beam acquisition process in the NR system applicable to various embodiments of the present disclosure may be performed as follows.

1) The BS transmits a synchronization block for each wide beam to allow the UE to discover the BS in the initial access stage, that is, in order for the UE to find the optimal wide beam to be used in the first stage of the beam acquisition by performing cell search or cell acquisition and measuring the channel quality of each wide beam.
2) The UE performs the cell search on the synchronization block for each beam and acquires a DL beam based on the detection result for each beam.
3) The UE performs a RACH procedure to inform the BS that the UE discovers that the UE intends to access the BS.
4) The BS connects or associates the synchronization block transmitted for each beam with a PRACH resource to be used for PRACH transmission to allow the UE to simultaneously inform the RACH procedure and the DL beam acquisition result (e.g., beam index) at wide beam levels. If the UE performs the RACH procedure on a PRACH resource associated with the optimal beam direction that the UE finds, the BS obtains information on the DL beam suitable for the UE by receiving a PRACH preamble.

In the multi-beam environment, it is a problem whether the UE and/or TRP is capable of accurately determining the directions of a transmission (TX) and/or reception (RX) beam between the UE and TRP. In the multi-beam environment, repetition of signal transmission or beam sweeping for signal reception may be considered based on the TX/RX reciprocal capability of the TRP (e.g., BS) or UE. The TX/RX reciprocal capability of the TRP and UE is also referred to as TX/RX beam correspondence of the TRP and UE. In the multi-beam environment, if the TX/RX reciprocal capability of the TRP and UE is not valid (that is, not held), the UE may not be capable of transmitting a UL signal in the beam direction in which the UE receives a DL signals. This is because the UL optimal path may be different from the DL optimal path. The TX/RX beam correspondence of the TRP may be valid (held) if the TRP is capable of determining a TRP RX beam for UL reception based on DL measurements measured by the UE for one or more TX beams of the TRP and/or if the TRP is capable of determining a TRP TX beam for DL transmission based on UL measurements measured by the TRP for one or more RX beams of the TRP. The TX/RX beam correspondence of the UE may be valid (held) if the UE is capable of determining a UE RX beam for UL transmission based on DL measurements measured by the UE for one or more RX beams of the UE and/or if the UE is capable of determining a UE TX beam for DL reception based on an indication from the TRP, which is related to UL measurements for one or more TX beams of the UE.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).
Type 2: the periodicity of a UL grant is configured by higher-layer signaling, and activation/deactivation of the CG is signaled by a PDCCH, to provide the UL grant.

Figure 12:
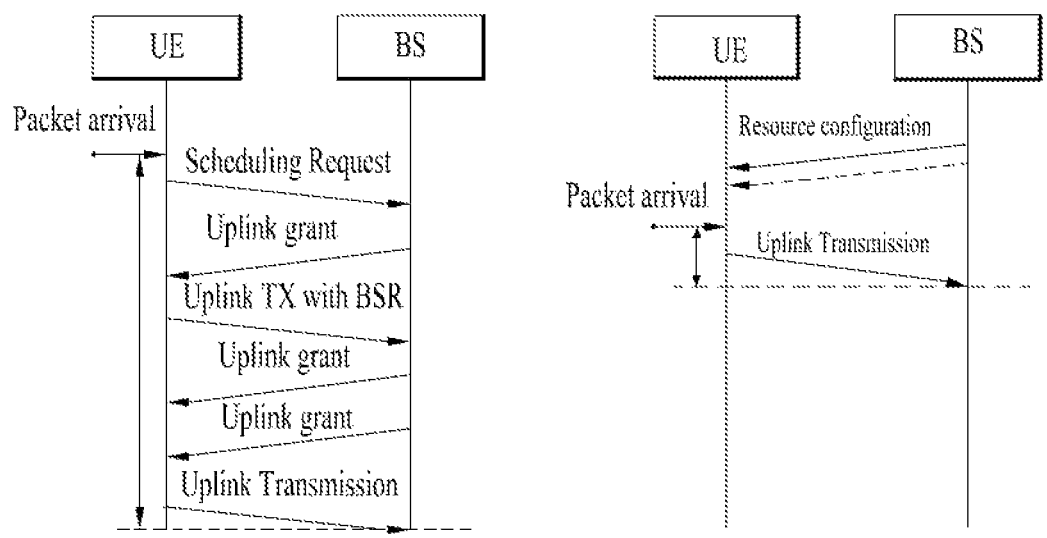
FIG. 12 illustrates exemplary uplink (UL) transmission operations of a user equipment (UE)

FIG. 12 illustrates exemplary UL transmission operations of a UE. The UE may transmit an intended packet based on a DG (FIG. 12(a)) or based on a CG (FIG. 12(b)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 13:
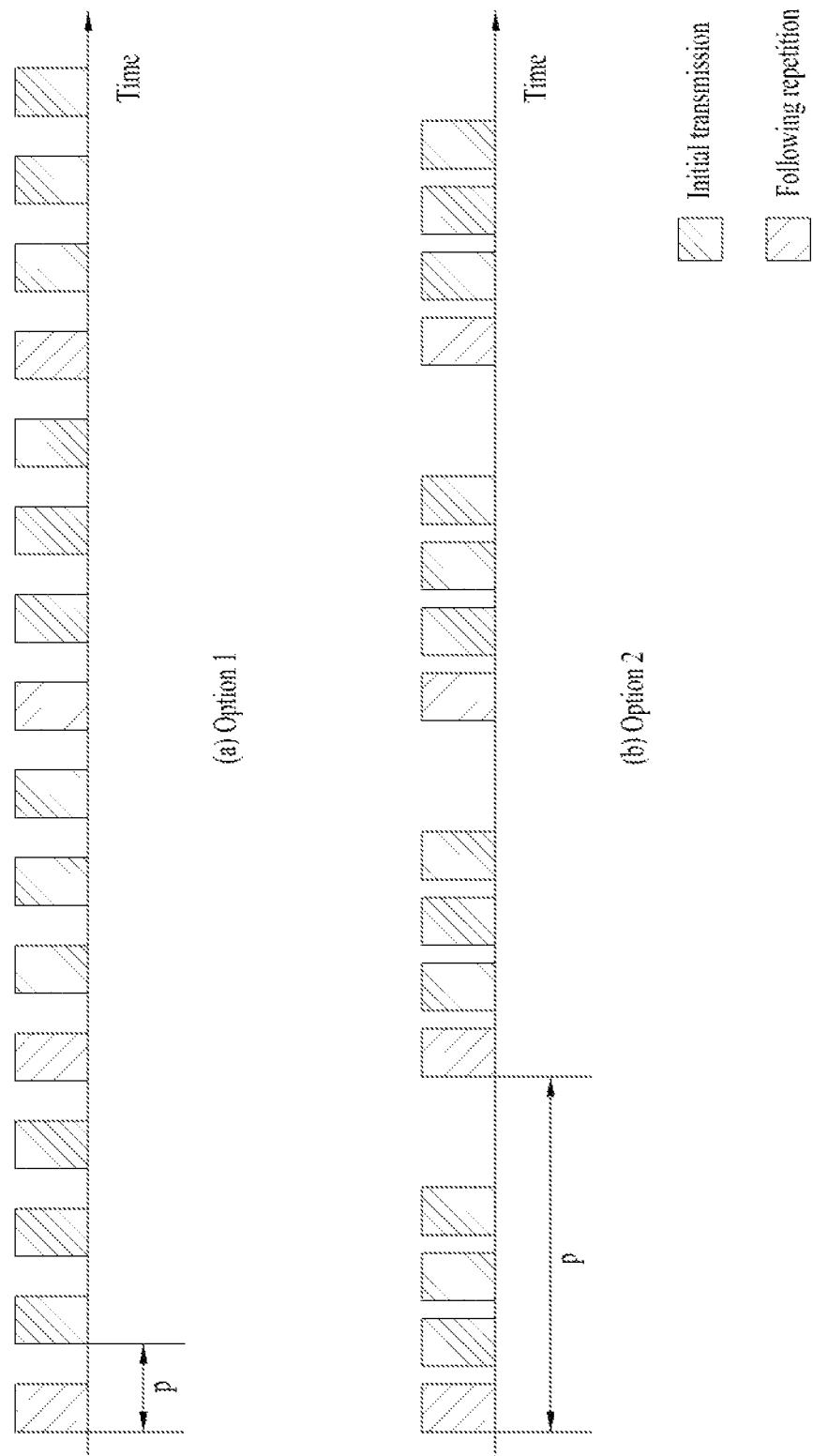
FIG. 13 illustrates exemplary repeated transmissions based on a configured grant.

FIG. 13 illustrates exemplary repeated transmissions based on a CG.

The UE performs repeated transmissions until one of the following conditions is satisfied:
A UL grant for the same TB is successfully received;
The repetition number of the TB reaches K; and
(In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TB s be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

FIG. 14 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7(*a*), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(*b*). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}=9$ us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

The COT may be shared for transmission between the BS and corresponding UE(s).

Specifically, sharing a UE-initiated COT with the BS may mean an operation in which the UE assigns a part of occupied channels through random backoff-based LBT (e.g., Category 3 (Cat-3) LBT or Category 4 (Cat-4) LBT) to the BS and the BS performs DL transmission using a remaining COT of the UE, when it is confirmed that a channel is idle by success of LBT after performing LBT without random backoff (e.g., Category 1 (Cat-1) LBT or Category 2 (Cat-2)

LBT) using a timing gap occurring before DL transmission start from a UL transmission end timing of the UE.

Meanwhile, sharing a gNB-initiated COT with the UE may mean an operation in which the BS assigns a part of occupied channels through random backoff-based LBT (e.g., Cat-3 LBT or Cat-4 LBT) to the UE and the UE performs UL transmission using a remaining COT of the BS, when it is confirmed that a channel is idle by success of LBT after performing LBT without random backoff (e.g., Cat-1 LBT or Cat-2 LBT) using a timing gap occurring before UL transmission start from a DL transmission end timing of the BS.

- DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.
- UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.
- Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 15:
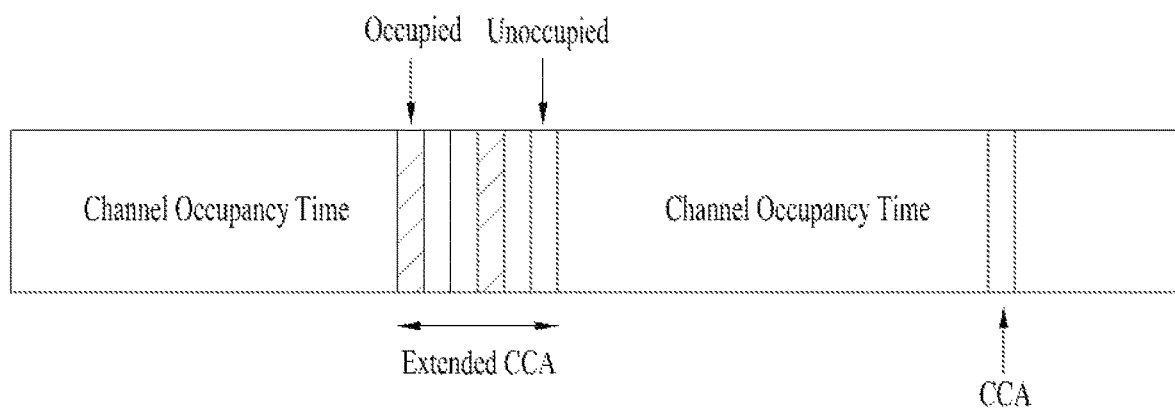
FIG. 15 illustrates an exemplary method of occupying resources in an unlicensed band.

FIG. 15 illustrates an exemplary method of occupying resources in an unlicensed band.

Referring to FIG. 15, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 10 describes an exemplary CAP supported in NR-U.

TABLE 10

| Type | | Explanation |
|---|---|---|
| DL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set. In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

An eNB/gNB or UE of an LTE/NR system should also perform LBT for signal transmission in an unlicensed band (referred to as a U-band for convenience). When the eNB or UE of the LTE/NR system transmits a signal, other communication nodes such as a Wi-Fi node should also perform LBT so as not to cause interference with transmission by the eNB or the UE. For example, in the Wi-Fi standard (801.11ac), a CCA threshold is defined as −62 dBm for a non-Wi-Fi signal and −82 dBm for a Wi-Fi signal. For example, when the non-Wi-Fi signal is received by a station (STA) or an access point (AP) with a power of more than −62 dBm, the STA or AP does not transmit other signals in order not to cause interference.

A UE performs a Type 1 or Type 2 CAP for a UL signal transmission in a U-band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 16:
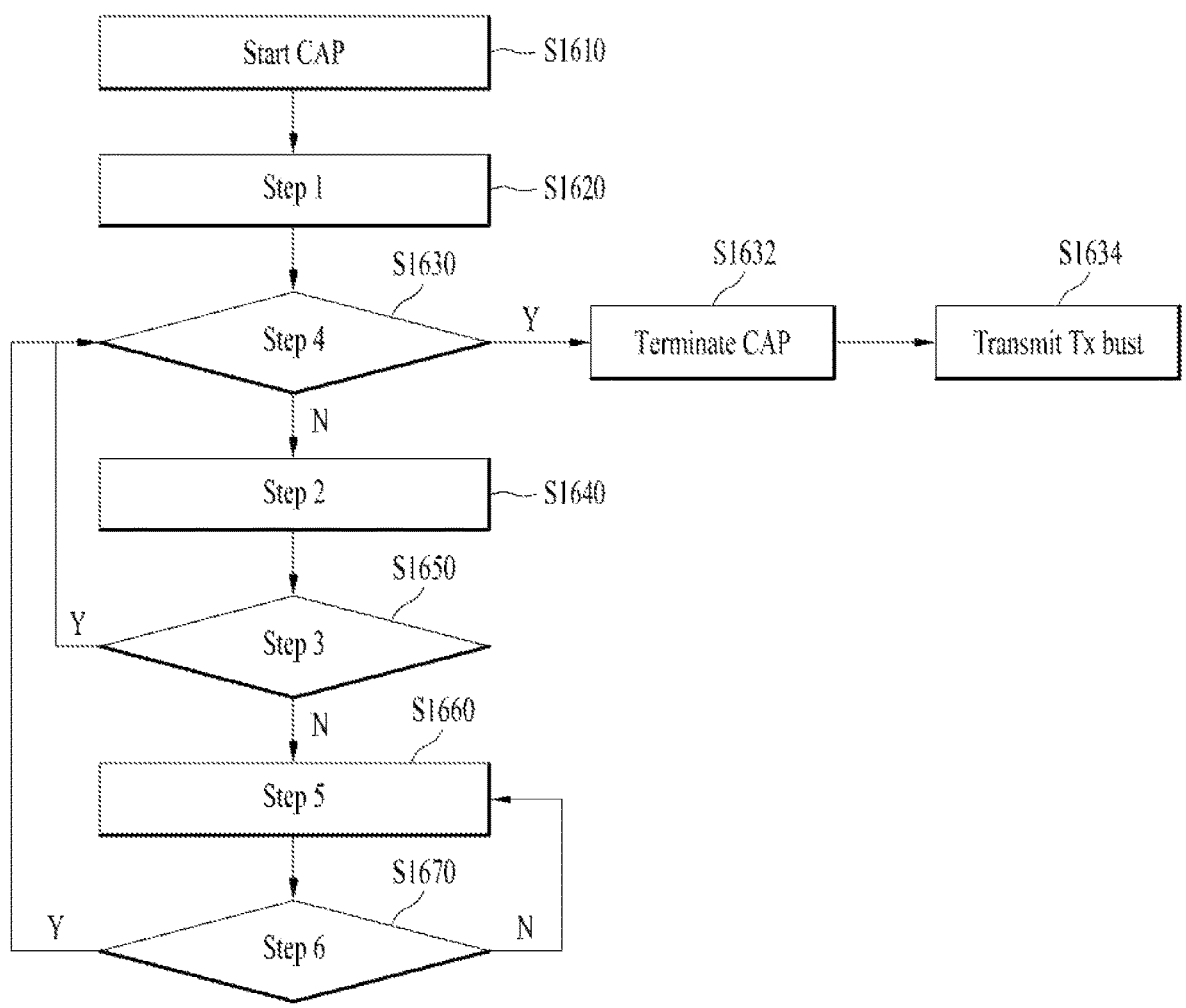
FIG. 16 illustrates an exemplary channel access procedure of a UE for UL signal transmission and/or DL signal transmission in an unlicensed band applicable to the present disclosure.

FIG. 16 illustrates a Type 1 CAP among CAPs of the UE for UL signal transmission and/or DL signal transmission in a U-band applicable to the present disclosure.

First, UL signal transmission in the U-band will be described with reference to FIG. 16.

The UE may sense whether a channel is idle for a sensing slot duration in a defer duration $T_d$. After a counter N is decremented to 0, the UE may perform a transmission (S934). The counter N is adjusted by sensing the channel for additional slot duration(s) according to the following procedure.

Step 1) Set N=$N_{init}$ where $N_{init}$ is a random number uniformly distributed between 0 and $CW_p$, and go to step 4 (S1620).

Step 2) If N>0 and the UE chooses to decrement the counter, set N=N−1 (S1640).

Step 3) Sense the channel for an additional slot duration, and if the additional slot duration is idle (Y), go to step 4. Else (N), go to step 5 (S1650).

Step 4) If N=0 (Y) (S1630), stop CAP (S1632). Else (N), go to step 2.

Step 5) Sense the channel until a busy sensing slot is detected within the additional defer duration $T_d$ or all slots of the additional defer duration $T_d$ are sensed as idle (S1660).

Step 6) If the channel is sensed as idle for all slot durations of the additional defer duration $T_d$ (Y), go to step 4. Else (N), go to step 5 (S1670).

Table 11 illustrates that $m_p$, a minimum CW, a maximum CW, a maximum channel occupancy time (MCOT), and an allowed CW size applied to a CAP vary according to channel access priority classes.

TABLE 11

| Channel Access Priority Class (p) | $m_p$ | CWmin,p | CWmax,p | Tulmcot,p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration $T_d$ includes a duration $T_f$ (16 us) immediately followed by $m_p$ consecutive slot durations where each slot duration $T_{sl}$ is 9 us, and $T_f$ includes a sensing slot duration $T_{sl}$ at the start of the 16-us duration. $CW_{min,p} \le CW_p \le CW_{max,p}$. $CW_p$ is set to $C_{min,p}$, and may be updated before Step 1 based on an explicit/implicit reception response to a previous UL burst (e.g., PUSCH) (CW size update). For example, $CW_p$ may be initialized to $C_{min,p}$ based on an explicit/implicit reception response to the previous UL burst, may be increased to the next higher allowed value, or may be maintained to be an existing value. In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration $T_{short\_dl}$ (=25 us). $T_{short\_dl}$ includes a duration Tf (=16 us) and one immediately following sensing slot duration. In the Type 2A UL CAP, $T_f$ includes a sensing slot at the start of the duration. In the Type 2B UL CAP, the UE may transmit a signal immediately after the channel is sensed as idle during a sensing slot duration $T_f$ (=16 us). In the Type 2B UL CAP, $T_f$ includes a sensing slot within the last 9 us of the duration. In the Type 2C UL CAP, the UE does not sense a channel before a transmission.

To allow the UE to transmit UL data in the U-band, the BS should succeed in an LBT operation to transmit a UL grant in the U-band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the U-band during the time period may defer the scheduled UL data transmission of the UE. In this context, a method of increasing the efficiency of UL data transmission in a U-band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

AUL of LTE LAA and a CG of NR show a big difference in terms of a method of transmitting HARQ-ACK feedback for a PUSCH that the UE has transmitted without receiving the UL grant and in terms of the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used by the UE for PUSCH transmission, whereas in the case of LTE LAA, the BS identifies the UE by a UE ID explicitly included in the AUL UCI transmitted together with the PUSCH as well as the DMRS resources.

In a wireless communication system supporting a U-band, one cell (or carrier (e.g., CC)) or BWP configured for the UE may be a wideband having a larger bandwidth (BW) than in legacy LTE. However, a BW requiring CCA based on an independent LBT operation may be limited according to regulations. If a subband (SB) in which LBT is individually performed is defined as an LBT-SB, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

Figure 17:
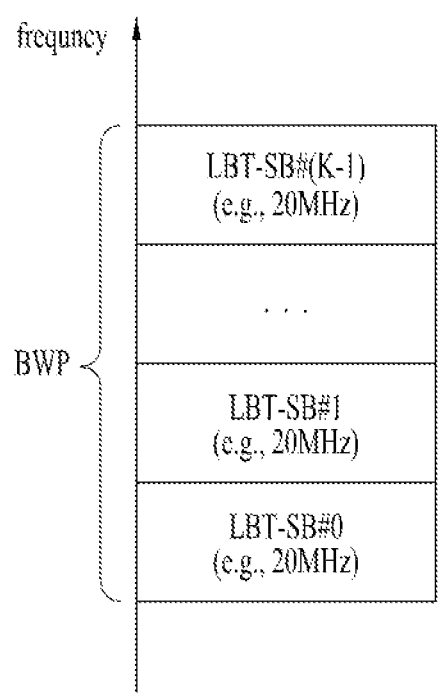
FIG. 17 is a diagram for explaining a plurality of listen-before-talk subbands (LBT-SBs) applicable to the present disclosure.

FIG. 17 illustrates that a plurality of LBT-SBs is included in a U-band.

Referring to FIG. 17, a plurality of LBT-SBs may be included in the BWP of a cell (or carrier). An LBT-SB may be, for example, a 20-MHz band. The LBT-SB may include a plurality of contiguous (P)RBs in the frequency domain and thus may be referred to as a (P)RB set. Although not illustrated, a guard band (GB) may be included between the LBT-SBs. Therefore, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined to be increased as a frequency band becomes higher starting from a low frequency band.

Figure 18:
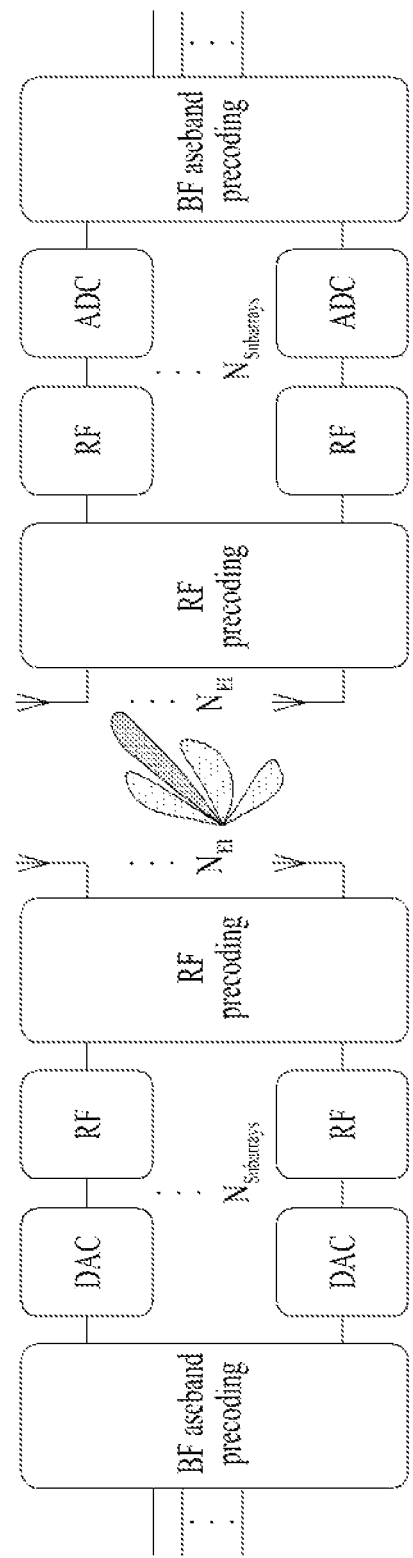
FIG. 18 is a diagram illustrating analog beamforming in the NR system.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment FIG. 18 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

Beam measurement: an operation by which the BS or UE measures the characteristics of a received beamformed signal Beam determination: an operation by which the BS or UE selects its Tx/Rx beams Beam sweeping: an operation of covering a spatial domain by using Tx and/or Rx beams for a prescribed time interval according to a predetermined method Beam report: an operation by which the UE reports information about a signal beamformed based on the beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 19:
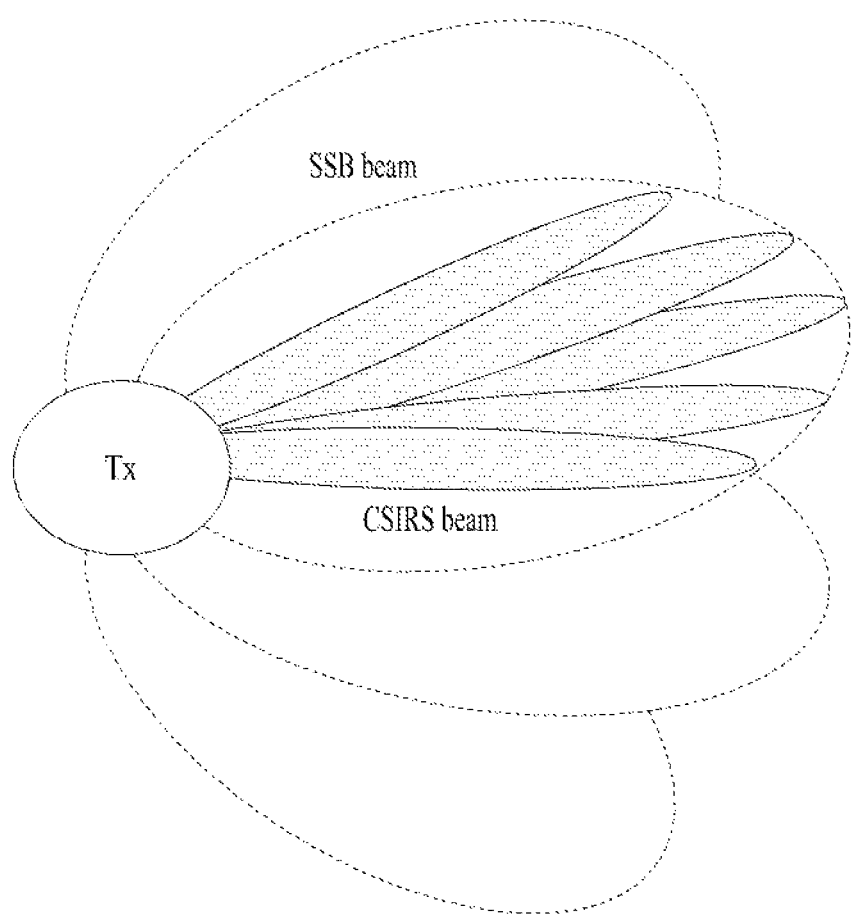
FIG. 19 is diagrams illustrating beam management in the NR system.

FIG. 19 is a diagram illustrating exemplary BF using an SSB and a CSI-RS.

Referring to FIG. 19, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

Quasi-Co Location (QCL)

The UE may receive a list of up to M TCI-State configurations to decode a PDSCH according to a detected PDCCH carrying DCI intended for a given cell. M depends on a UE capability.

As described in Table 10, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

UL BM Process

In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM process to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K≥1 SRS resources, where K is a natural number, and the maximum value of K is indicated by SRS_capability.

The UL BM process may also be divided into Tx beam sweeping at the UE and Rx beam sweeping at the BS similarly to DL BM.

Figure 20:
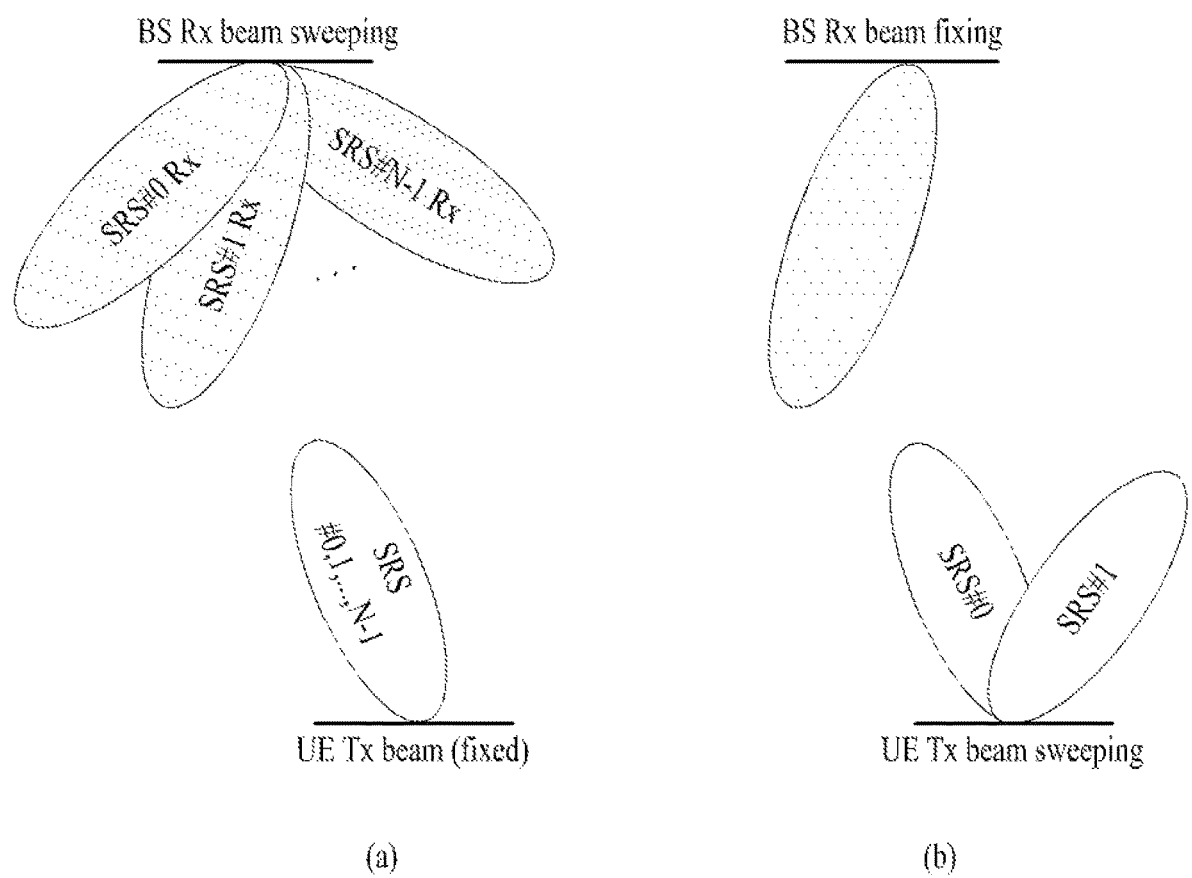
FIGS. 20 and 21 are diagrams for explaining a sounding reference signal (SRS) applicable to the present disclosure.

FIG. 20 illustrates an example of a UL BM process based on an SRS.

FIG. 20(*a*) shows a process in which the BS determines Rx beamforming, and FIG. 20(*b*) shows a process in which the UE performs Tx beam sweeping.

Figure 21:
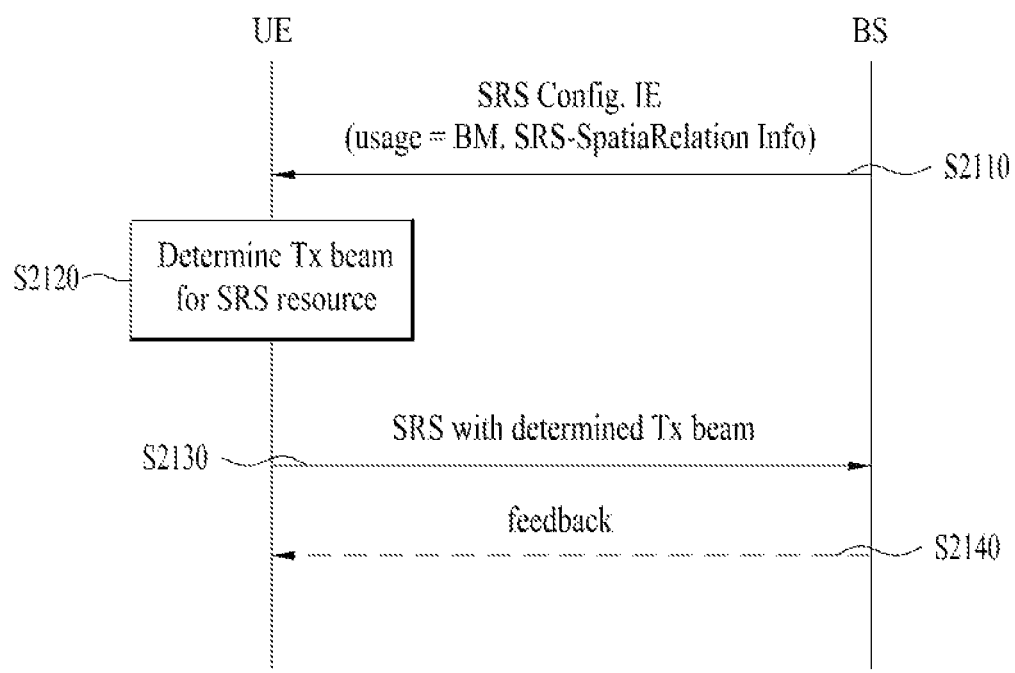

FIG. 21 is a flowchart illustrating an example of a UL BM process based on an SRS.

The UE receives RRC signaling (e.g., SRS-Config IE) including a usage parameter (RRC parameter) set to BM from the BS (S2110). The SRS-Config IE is used to configure SRS transmission. The SRS-Config IE includes a list of SRS resources and a list of SRS resource sets. Each SRS resource set refers to a set of SRS resources.

The UE determines Tx beamforming for SRS resources to be transmitted based on SRS-SpatialRelation Info included in the SRS-Config IE (S2120). Here, the SRS-SpatialRelation Info is configured for each SRS resource and indicates whether the same beamforming as that used for an SSB, a CSI-RS, or an SRS is applied for each SRS resource.

If SRS-SpatialRelationInfo is configured for the SRS resources, the same beamforming as that used in the SSB, CSI-RS, or SRS is applied and transmitted. However, if SRS-SpatialRelationInfo is not configured for the SRS resources, the UE randomly determines the Tx beamforming and transmits an SRS based on the determined Tx beamforming (S2130).

For a P-SRS in which 'SRS-ResourceConfigType' is set to 'periodic':

i) If SRS-SpatialRelationInfo is set to SSB/PBCH', the UE transmits the corresponding SRS by applying the same spatial domain transmission filter as a spatial domain reception filter used for receiving the SSB/PBCH (or a spatial domain transmission filter generated from the spatial domain reception filter);

ii) If SRS-SpatialRelationInfo is set to 'CSI-RS', the UE transmits the SRS by applying the same spatial domain transmission filter as that used for receiving the CSI-RS; or iii) If SRS-SpatialRelationInfo is set to 'SRS', the UE transmits the corresponding SRS by applying the same spatial domain transmission filter as that used for transmitting the SRS.

Additionally, the UE may or may not receive feedback on the SRS from the BS as in the following three cases (S2140).

i) When Spatial_Relation_Info is configured for all SRS resources in an SRS resource set, the UE transmits the SRS on a beam indicated by the BS. For example, if Spatial_Relation_Info indicates the same SSB, CRI, or SRI, the UE repeatedly transmits the SRS on the same beam.

ii) Spatial_Relation_Info may not be configured for all SRS resources in the SRS resource set. In this case, the UE may transmit while changing the SRS beamforming randomly.

iii) Spatial_Relation_Info may be configured only for some SRS resources in the SRS resource set. In this case, the UE may transmit the SRS on an indicated beam for the configured SRS resources, but for SRS resources in which Spatial_Relation_Info is not configured, the UE may perform transmission by applying random Tx beamforming.

Figure 22:
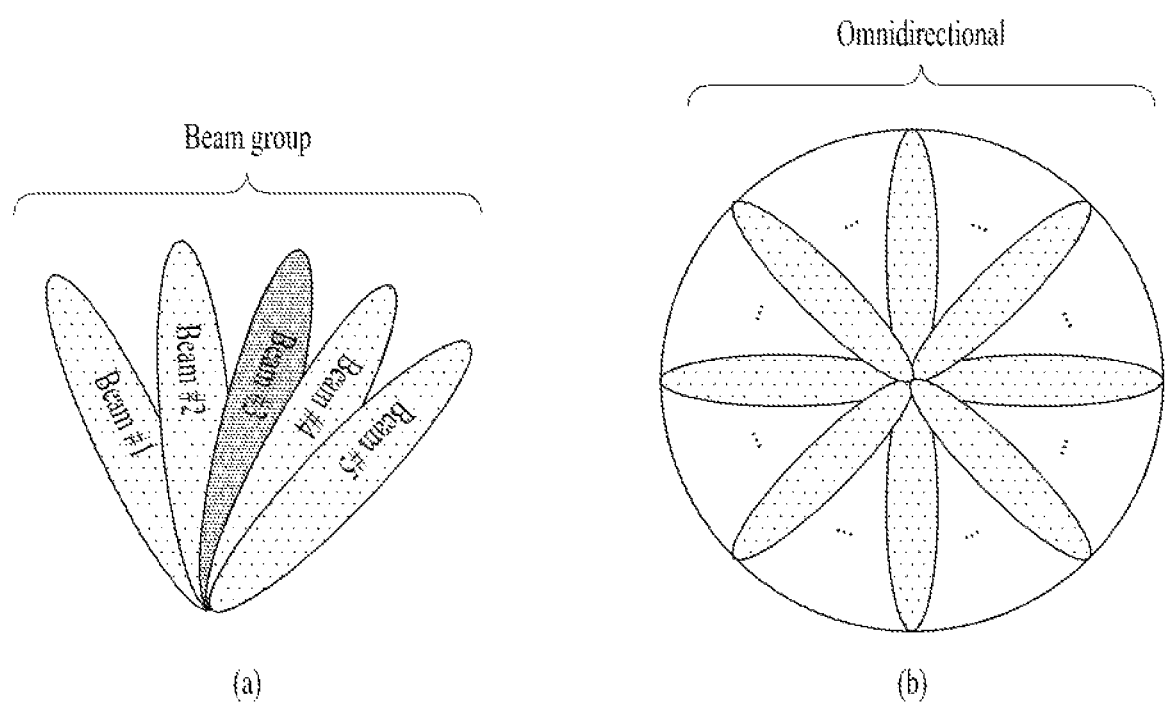
FIG. 22 is a diagram for explaining beam-based LBT and beam group-based LBT according to an embodiment of the present disclosure.

FIG. 22 illustrates exemplary directional LBT and exemplary omnidirectional LBT.

FIG. 22(a) illustrates directional LBT including specific beam direction LBT and/or beam group unit LBT, and FIG. 19(b) illustrates omnidirectional LBT.

Referring to FIG. 22(a), when a beam group consists of beams #1 to #5, performing LBT based on beams #1 to #5 may be referred to as beam group unit LBT. In addition, performing LBT through any one (e.g., beam #3) of beams #1 to #5 may be referred to as specific beam direction LBT. In this case, beams #1 to #5 may be continuous (or adjacent) beams but may also be discontinuous (or non-adjacent) beams. Further, the number of beams included in the beam group is not necessarily plural, and a single beam may form one beam group.

FIG. 22(b) illustrates omnidirectional-LBT. When omnidirectional beams constitute one beam group and perform LBT in units of the corresponding beam group, this may be interpreted as performing omnidirectional LBT. In other words, if beams of all directions, i.e., omnidirectional beams which are a set of beams covering a specific sector in a cell, are included in one beam group, this may mean omnidirectional LBT.

In proposed methods to be described later, a beam may mean an area for performing a specific operation (e.g., LBT or transmission) by concentrating power in a specific direction and/or in a specific space. In other words, the UE or the BS may perform an operation such as LBT or transmission by targeting a specific area (i.e., a beam) corresponding to a specific space and/or a specific direction. Thus, each beam may correspond to each space and/or each direction. In addition, the UE or the BS may use a spatial domain filter corresponding to each space and/or each direction in order to use each beam. That is, one spatial domain filter may correspond to one or more beams. The UE or the BS may perform an operation such as LBT or transmission using the spatial domain filter corresponding to a beam (or space and/or direction) to be used.

For example, the UE or the BS may perform LBT using a spatial domain filter corresponding to an LBT beam in a space and/or a direction for the corresponding LBT beam or perform DL/UL transmission using a spatial domain filter corresponding to a Tx beam in a space and/or a direction for the corresponding Tx beam.

In a high-frequency band of 52.6 GHz or higher, due to a relatively larger path loss than in a low-frequency band, omnidirectional LBT (hereinafter, O-LBT) for performing LBT in all directions, omnidirectional transmission and reception, directional LBT (hereinafter, D-LBT) for performing LBT only in a specific beam direction, and directional transmission and reception, through a technique such as analog beamforming using multiple antennas, may be considered.

Accordingly, the BS needs to indicate, to the UE, a type of LBT to be used during UL signal/channel transmission and a direction in which LBT will be performed. In the present disclosure, a method in which the BS configures the direction of a beam in which LBT is to be performed according to a mode of the UE is described. In other words, the present disclosure proposes a method of configuring the direction of a beam in which LBT is to be performed (hereinafter, LBT beam) according to whether the UE is an idle/inactive mode or in a connected mode.

A typical CAP performed for transmission in a U-band is LBT. LBT is a mechanism that prevents collision between transmissions by allowing transmission of a corresponding signal when a noise level is less than a certain level as a result of comparing a surrounding interference level measured by the BS and/or the UE that is to transmit signals with a specific threshold such as an ED threshold.

In the case of a high frequency band, coverage may be limited due to significant path loss. In order to overcome such a coverage problem, a multi-antenna technique may be used. For example, narrow-beam transmission in which a signal is transmitted by concentrating energy in a specific direction, rather than omnidirectional transmission, may be performed.

In a high-frequency U-band, along with a CAP such as LBT described above, beam-based transmission combined therewith needs to be considered. For example, in order to perform D-LBT in a specific direction, D-LBT may be performed only in the corresponding direction or LBT may be performed in units of a beam group including a beam of the corresponding direction. Then, if a channel is determined to be idle, transmission may be performed. Here, the beam group may include a single beam or a plurality of beams. If the beam group includes omnidirectional beams, D-LBT may be extended to O-LBT.

Since beam-based transmission described above transmits a signal by concentrating energy in a specific direction, interference affecting neighboring BSs/UEs (except for nodes located in a transmission direction) may be relatively small as compared with omnidirectional transmission. That is, it may be considered that spectrum sharing is naturally formed in beam-based transmission because beam-based transmission causes interference only in a specific direction. Therefore, if a specific condition is satisfied, a channel access opportunity may be increased and system performance may be improved by performing beam-based transmission without performing LBT.

Information about a beam group in which each beam is included and information about at least one beam included in each beam group may be configured, and a CWS and a backoff counter value may be separately managed for each individual beam or each individual beam group. Therefore, when performing LBT, an event such as CWS resetting/increase or backoff counter decrease may affect each beam and a beam group in which each beam is included. For example, if feedback for data transmitted through LBT in a specific beam direction is NACK and thus a CWS value for the corresponding beam direction is increased, the increase of the CWS value is also reflected in the CWS managed by the beam group in which the corresponding beam is included, so that a CWS value for the beam group may be increased. On the other hand, even if the CWS value for the corresponding beam direction is increased, the CWS value for the beam group may be independently managed without affecting the beam group including the corresponding beam. In addition, the backoff counter value managed based on each beam or each beam group may also be configured as described above such that the back-off counter value for each beam and the back-off counter value for each beam group are independently managed or depend on each other to affect each other.

Beam-based LBT and beam group-based LBT may be interchanged under a specific condition. In the case of UL transmission, the BS may indicate an LBT type to be used among the two LBT types (i.e., beam-based LBT and beam group-based LBT). In the case of CG UL transmission, when configuring resources for CG UL transmission, an LBT type to be performed on each resource may be configured as well. If delay-sensitive data transmission is indicated together with LBT in a specific beam direction, data may not be transmitted due to LBT failure. Therefore, a channel access opportunity may be increased by allocating a plurality of LBT opportunities to other beams in a beam group in which the corresponding beam is included.

In this disclosure, a beam-based LBT procedure or a beam group-based LBT procedure may basically mean a random backoff-based Cat-3 or Cat-4 LBT. In beam-based LBT, energy measured by performing carrier sensing in a specific direction is compared with an ED threshold. Next, if the energy measured by performing carrier sensing is lower than the ED threshold, a channel in the corresponding beam direction may be considered to be idle and, if the energy measured through carrier sensing is higher than the ED threshold, the channel in the corresponding beam may be considered to be busy.

The beam group-based LBT procedure is to perform the above-described LBT procedure in all beam directions included in a beam group and to transmit signals when LBT is successful by performing a random backoff-based LBT procedure as a representative using a corresponding beam, similar to multi-CC LBT when a beam (e.g., a representative beam) of a preconfigured/indicated specific direction is present in a beam group and performing non-random backoff-based Cat-1 or Cat-2 LBT for the remaining beams included in the beam group. In the beam group-based LBT procedure, according to the regulation of each country/region, the random backoff-based LBT procedure may be performed through the representative beam, and no-LBT may be performed on the remaining beams included in the beam group to transmit signals through each of the remaining beams.

Before a description of proposed methods, NR-based channel access schemes for a U-band used in the present disclosure are classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

Meanwhile, each proposed method to be described later may be combined with other proposed methods and be applied together therewith unless each proposed method conflicts with other proposed methods.

The BS transmits information needed when UEs (initially) access a corresponding cell through a synchronization signal (SS)/physical broadcast channel (PBCH) block (hereinafter, SSB). The SSB includes timing information, such as an SS, a system frame number (SFN), and a most significant bit (MSB) of an SSB index, an SSB-carrier offset value for physical resource block (PRB) grid alignment, a PDCCH configuration for a subcarrier spacing and SIB1, an RMSI CORESET/search space such as a demodulation reference signal (DMRS) type A position, information about an initial active DL BWP, and barring information.

Such an SSB is transmitted with a specific index through beam sweeping at a determined time domain position. For example, directions of beams transmitted with respect to respective SSB indexes may be different. Before transmitting a PRACH (msgA in the case of a 2-step RACH) for corresponding cell access, the UE may select an SSB having the best reception sensitivity among SSBs received in various beam directions. Alternatively, the UE may select an SSB having a reference signal received power (RSRP) of a specific threshold or higher among the received SSBs.

When there is no SSB having the RSRP of the threshold or higher, the UE may select an SSB received in an arbitrary SSB direction and transmit the PRACH (msgA in the case of the 2-step RACH) in a direction associated with an RACH occasion (RO) which is associated with the selected SSB index.

In a region in which a spectrum sharing mechanism for channel access such as LBT in a U-band is necessarily required, both the BS and the UE should perform transmission after confirming whether a channel is idle. The CAP such as LBT described above is applied even to transmission of the PRACH (or msgA).

Therefore, the UE should perform LBT prior to transmission of the PRACH (or msgA). As described above, in a high-frequency band of 52.6 GHz or higher, a technique such as analog beamforming utilizing multiple antennas is used due to a relatively larger path loss than in a low-frequency band, and omnidirectional LBT (hereinafter, O-LBT) for performing LBT in all directions, omnidirectional transmission and reception, directional LBT (hereinafter, D-LBT) for performing LBT only in a specific beam direction, and directional transmission and reception may be considered.

In order for the UE to perform D-LBT in a specific beam direction, the beam direction in which LBT is to be performed should be previously configured/indicated by the BS. The BS may differently configure/indicate the direction of the beam in which LBT is to be performed according to a mode of the UE. In other words, the BS may differently configure/indicate the direction of the beam (hereinafter, LBT beam) in which LBT is to be performed according to whether the mode of the UE is an idle/inactive mode or a connected mode.

Figure 23:
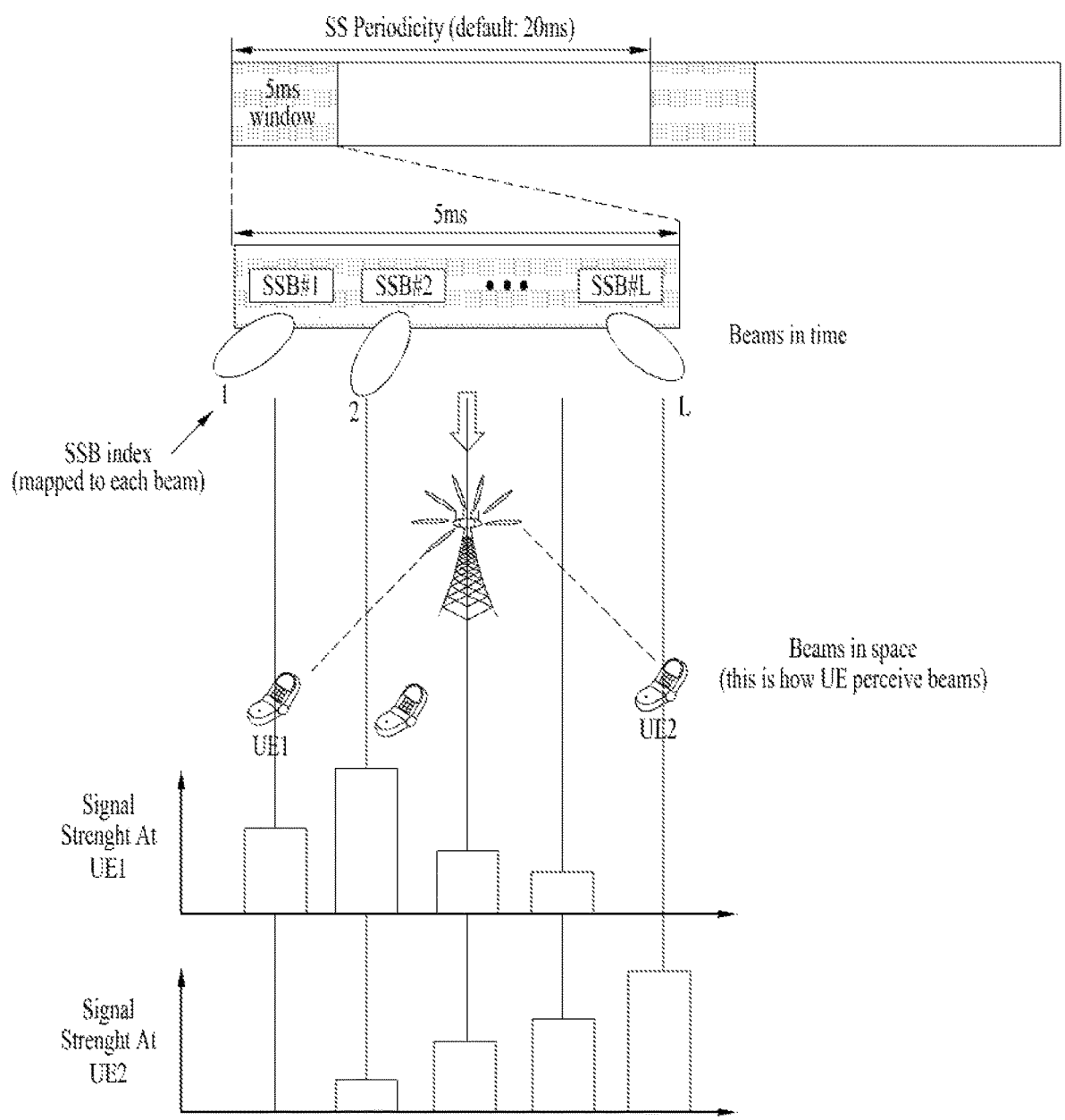
FIGS. 23 and 24 are diagrams for explaining problems occurring while directional-LBT (D-LBT) is performed according to an embodiment of the present disclosure.
Figure 24:
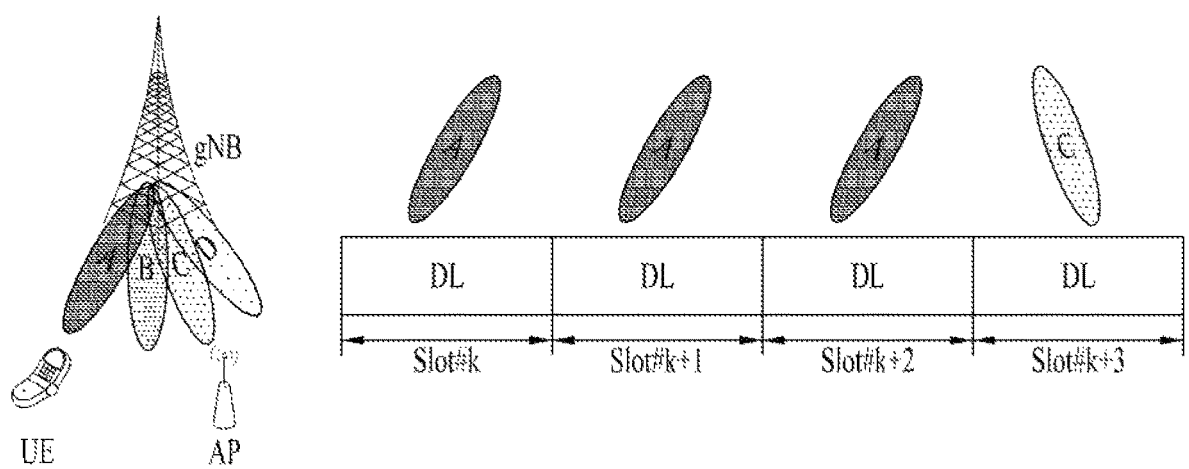

FIG. 23 illustrates an example of Rx strength of an SSB signal in each Rx beam direction from the viewpoint of UE 1 and UE 2 when the BS sequentially transmits an SSB through beam sweeping of each SSB index within a window of 5 ms at a periodicity of 20 ms. In FIG. 23, UE 1 and UE 2 may determine that an SSB beam direction received with the highest Rx sensitivity as the best beam and transmit a PRACH or msgA in the corresponding beam direction in an RO to which the SSB beam is mapped. For example, referring to FIG. 23, UE 1 may determine SSB index #2 as the best beam and transmit the PRACH or msgA in an RO mapped to SSB index #2, and UE 2 may determine SSB index #L as the best beam and transmit the PRACH or msgA in an RO mapped to SSB index #L.

Meanwhile, when beam reciprocity is established between DL beams and UL beams, either a procedure for determining a DL beam pair or a procedure for determining a UL beam pair may be omitted. This may be equally applied even when beam correspondence is established.

Here, "beam reciprocity (or beam correspondence) is established" may mean that it is assumed that a BS Tx beam and a BS Rx beam coincide and a UE Tx beam and a UE Rx beam coincide in communication between the BS and the UE. Here, the BS Tx beam and the BS Rx beam may mean a DL Tx beam and a DL Rx beam, respectively, and the UE Tx beam and the UE Rx beam may mean a UL Tx beam and a UL Rx beam, respectively. Here, the Tx beam may mean a transmission beam, and the Rx beam may mean a reception beam.

A CCA area is an area for evaluating whether a channel is occupied through an LBT procedure. If energy measured with respect to a specific Rx beam direction is higher than an energy detection (ED) threshold, the BS or the UE may determine that the channel is busy because this may mean that another BS or UE in the vicinity of the BS or the UE is occupying the channel and is transmitting a signal. When the measured energy is lower than the ED threshold, the BS or the UE may consider the channel to be idle, terminate the LBT procedure, and start transmission of a DL/UL signal/channel.

It may be desirable for the following reasons to configure all DL signals/channels (or all UL signals/channels) included in one Tx burst as signals/channels having a spatial (partial) QCL relation. For example, in transmitting a Tx burst consisting of a total of 4 slots after the BS succeeds in LBT as illustrated in FIG. 20, the BS may transmit a signal in 3 slots in a beam direction of A and then transmit a signal in the fourth slot in a beam direction of C.

However, while the BS transmits a signal in the beam direction of A, a Wi-Fi AP coexisting in a corresponding U-band may fail to detect the signal transmitted in the beam direction of A and determine that a channel is idle. After succeeding in LBT, the Wi-Fi AP may start to transmit and receive a signal. In this case, if the BS transmits a signal in the beam direction of C starting from slot #k+3, the signal may act as interference with a corresponding Wi-Fi signal. Thus, when the BS that has performed transmission in the direction of A performs transmission by switching a beam direction without additional LBT, the BS may cause interference with another coexisting wireless node. Therefore, it may be desirable not to switch a Tx beam direction of a Tx burst that is transmitted after the BS succeeds in LBT.

In the NR system, a method of signaling beam information to be used by the UE during UL transmission and reception by associating a DL signal and a UL signal is under consideration. For example, if there is a beam direction generated by the UE on a channel state information reference signal (CSI-RS) resource by associating the CSI-RS resource and a sounding reference signal (SRS) resource, when the UE transmits an SRS on the SRS resource linked with the CSI-RS resource (or when the UE transmits a PUSCH scheduled through a UL grant through which the SRS resource linked with the CSI-RS resource is signalled), the UE may transmit the UL signal using a Tx beam corresponding to a CSI-RS Rx beam. In this case, the relationship between a specific Rx beam and a specific Tx beam may be configured by the UE in implementation when the UE has beam correspondence capability. Alternatively, the relationship between the specific Rx beam and the specific Tx beam may be configured by training of the BS and the UE when the UE has no beam correspondence capability.

Therefore, when an association relationship between the DL signal and the UL signal is defined, COT sharing may be allowed between a DL Tx burst consisting of DL signals/channels in a spatial (partial) QCL relation with the DL signal and a UL Tx burst consisting of UL signals/channels in a spatial (partial) QCL relation with the UL signal associated with the DL signal.

Here, the UL signals/channels may include at least one or more of the following signals/channels:
  an SRS, a demodulation reference signal (DMRS) for a PUCCH, a DMRS for a PUSCH, a PUCCH, a PUSCH, or a PRACH Here, the DL signals/channels may include at least one or more of the following signals/channels:
  a PSS, an SSS, a DMRS for a PBCH, a PBCH, a tracking reference signal (TRS), a CSI-RS for tracking, a CSI-RS for CSI acquisition, a CSI-RS for radio resource management (RRM) measurement, a CSI-RS for BM, a DMRS for a PDCCH, a DMRS for a PDSCH, a PDCCH (or a control resource set (CORESET) in which the PDCCH may be transmitted), a PDSCH, or a signal introduced for the purpose of tracking, (fine) time/frequency synchronization, coexistence, power saving, or frequency reuse factor=1, arranged in front of a Tx burst, as a modified signal of the above-listed signals or related signals or as a newly introduced signal.

Prior to describing proposed methods, overall operation processes of the UE and the BS for implementing the proposed methods to be described later will now be described.

Figure 25:
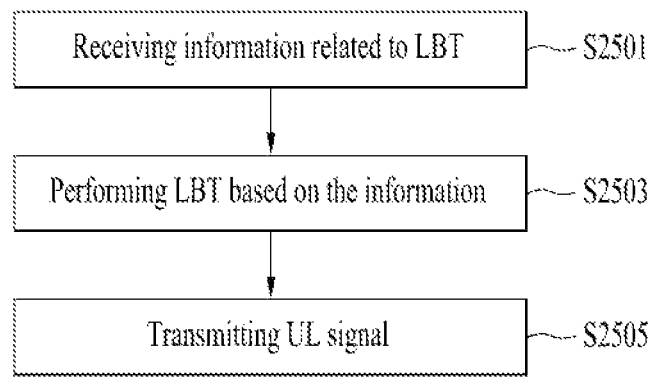
FIGS. 25 to 27 are diagrams for explaining overall operation processes of a UE and a BS according to an embodiment of the present disclosure.

FIG. 25 is a diagram for explaining the overall operation process of the UE according to at least one proposed method.

Referring to FIG. 25, the UE may receive information related to LBT from the BS (S2501). The information related to LBT and a detailed method of receiving the information may be based on at least one of [Proposed Method #1], [Proposed Method #3], or [Proposed Method #5].

The UE may perform LBT for transmitting a UL signal based on the received information (S2503). If a channel is determined to be idle as a result of performing LBT, the UE may transmit the UL signal (S2505). A detailed method for the UE to transmit the UL signal by performing LBT may be based on at least one of [Proposed Method #1], [Proposed Method #2], or [Proposed Method #4].

Figure 26:
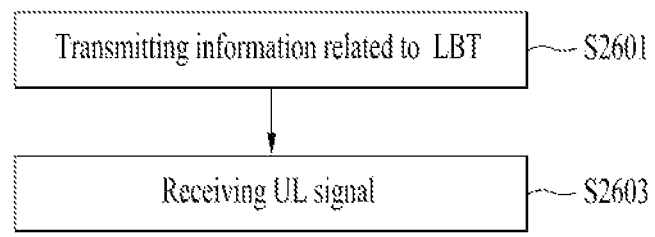

FIG. 26 is a diagram for explaining the overall operating process of the BS according to the at least one proposed method.

Referring to FIG. 26, the BS may transmit information related to LBT to the UE (S2601). The information related to LBT and a detailed method of receiving the information may be based on at least one of [Proposed Method #1],

[Proposed Method #3], or [Proposed Method #5].

The BS may receive a UL signal from the UE (S2603). The received UL signal may be transmitted based on at least one of [Proposed Method #1], [Proposed Method #2], and [Proposed Method #4].

Figure 27:
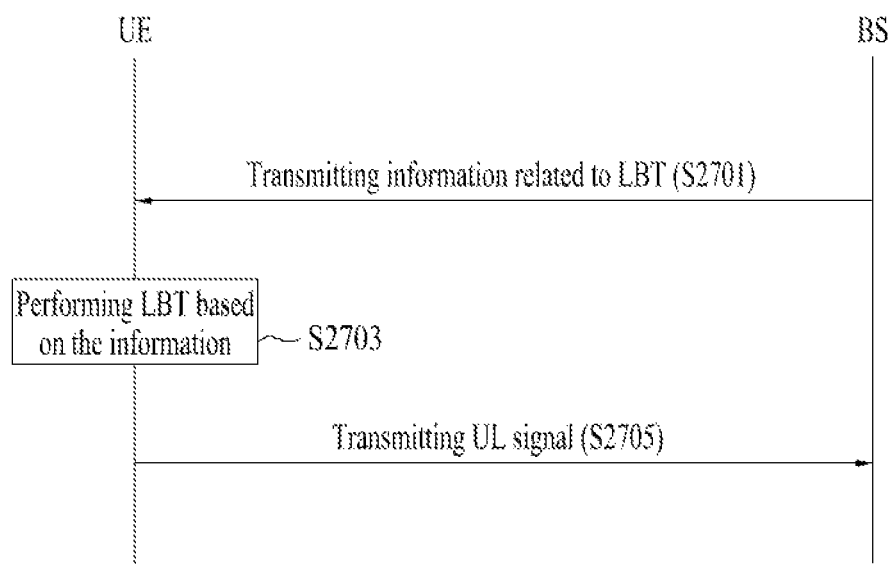

FIG. 27 is a diagram for explaining an overall operation process of a network according to at least one proposed method.

The BS may transmit information related to LBT (S2701). The information related to LBT and a detailed method of transmitting the information may be based on at least one of [Proposed Method #1], [Proposed Method #3], or [Proposed Method #5].

The UE may perform LBT for transmitting a UL signal based on the information received from the BS (S2703). If a channel is determined to be idle as a result of performing LBT, the UE may transmit the UL signal to the BS (S2705). A method for the UE to transmit the UL signal by performing LBT may be based on at least one of [Proposed Method #2] or [Proposed Method #4].

Proposed Method #1

A method of configuring an LBT beam of a UE for initial access or a UE in an idle/inactive mode 1. Embodiment #1-1

The type of LBT to be used for an RACH procedure such as PRACH or msgA transmission may be configured through a higher layer signal (e.g., radio resource control (RRC) signal) such as an SIB.

(1) In an initial access step before RRC connection, O-LBT may be used by default and, after RRC connection, whether O-LBT will be used or D-LBT will be used may be configured for/indicated to the UE by the BS.

2. Embodiment #1-2

If beam correspondence is established, the UE may transmit the PRACH or msgA after performing D-LBT in an Rx direction of an SSB beam. If beam correspondence is not established, the UE may transmit the PRACH or msgA after performing D-LBT or O-LBT in units of a beam group.

3. Embodiment #1-3

The UE may perform LBT and transmit the PRACH or msgA according to an RSRP threshold configured to select the best beam direction as follows.

(1) Case in which single SSB RSRP threshold is configured

1) The UE may perform D-LBT in beam directions corresponding to SSBs in all ROs corresponding to all SSBs having the RSRP threshold or higher and transmit the PRACH or msgA in a beam direction in which D-LBT is successful.

2) Priorities are configured for the SSBs having the RSRP threshold or higher in a manner of assigning a high priority to high Rx strength. The UE may attempt to sequentially perform D-LBT in ROs starting from an RO corresponding to an SSB of the highest priority and transmit the PRACH or msgA in a beam direction in which D-LBT is successful. For example, the UE may attempt to sequentially perform D-LBT in ROs from an RO corresponding to the SSB of the highest priority to an RO corresponding to an SSB of the lowest priority and transmit the PRACH or msgA in a beam direction in which D-LBT is first successful.

3) Upon failing to perform D-LBT in all of the ROs corresponding to the SSBs having the RSRP threshold or higher in 2) above, the UE may re-attempt to sequentially perform D-LBT in ROs starting from an RO in which D-LBT is attempted for the first time or may be switched to perform O-LBT to attempt to perform LBT. Then, the UE may transmit the PRACH or msgA in a beam direction in which LBT is successful.

(2) Case in which a plurality of RSRP thresholds (e.g., Th_1 and Th_2, Th_1>Th_2) is configured 1) When a plurality of SSBs having a first threshold (Th_1) or higher is present, the UE may select one arbitrary SSB from among the SSBs having Th_1 or higher or select an SSB of the highest priority when a high priority is assigned to an SSB having high Rx strength. The UE may attempt to perform D-LBT only in an RO corresponding to the selected SSB. Upon failing to perform LBT, the UE may reattempt to perform D-LBT by reselecting an SSB of the next highest priority or an arbitrary SSB among SSBs except for the previously selected SSB. The UE may transmit the PRACH or msgA in a beam direction in which D-LBT is successful.

2) When an SSB having Th_1 or higher is not present and only an SSB having a second threshold (Th_2) or higher is present, the UE may attempt to perform O-LBT in an RO corresponding to the SSB having Th_2 or higher and, upon succeeding in performing O-LBT, the UE may transmit the PRACH or msgA.

4. Embodiment #1-4

In the case of contention-free random access (CFRA) triggered by scheduling (e.g., PDCCH order) of the BS in a connected mode of the UE, the UE may perform D-LBT with respect to an RO and dedicated preamble indicated to the UE. In contrast, in the case of contention-based random access (CBRA) such as an idle/inactive mode of the UE, the UE may always perform O-LBT.

Here, a single LBT beam may also be mapped to a plurality UL Tx beams in [Proposed Method #1].

Hereinafter, [Proposed Method #1] will be described in detail.

As described above, in order to access a channel in a U-band, both the UE and the BS should perform LBT before transmission in an area in which the spectrum sharing mechanism such as LBT is mandatory. In order to initially access the BS, the UE may receive SSBs which are swept in different beam directions to obtain basic information of a cell and RACH-related information (e.g., RACH configuration). In addition, the UE may select an SSB having high Rx strength (or RSRP) (e.g., an SSB exceeding an RSRP threshold) from among the received SSBs or select an arbitrary SSB. The UE may transmit the PRACH or msgA in an RO and beam direction associated with an SSB index of the selected SSB. In order to transmit a UL signal in a direction associated with the selected SSB, the UE should succeed in performing D-LBT or O-LBT in the corresponding direction.

In this case, the BS may configure the type of LBT for transmitting the PRACH or msgA for the UE attempting initial access through a higher layer signal (e.g., RRC signal) such as an SIB. For example, when the BS broadcasts the RACH-related information through SIB1, if the type of LBT to be used in an RO is configured as O-LBT, the UE will perform O-LBT in a similar manner to Rel-16 NR-U and, if O-LBT is successful, the UE will transmit the PRACH or msgA.

As another example, if the BS indicates D-LBT through SIB 1, the UE may select an SSB exceeding the RSRP threshold from among SSBs received in a plurality of beam directions or select an arbitrary SSB. The UE may perform D-LBT in an RO and beam direction associated with an SSB index of the selected SSB and, if D-LBT is successful, the UE may transmit the PRACH or msgA.

Alternatively, before RRC connection such as initial access, the UE may transmit a UL signal using O-LBT unconditionally by default and, after RRC connection, whether O-LBT will be continuously performed or switching to D-LBT will be performed may be configured by the BS.

Beam correspondence may mean that it may be assumed that a BS Tx beam and a BS Rx beam coincide and a UE Tx beam and a UE Rx beam coincide in communication between the BS and the UE. Here, the BS Tx beam and the BS Rx beam may mean a DL Tx beam and a DL Rx beam, respectively, and the UE Tx beam and the UE Rx beam may mean a UL Tx beam and a UL Rx beam, respectively.

When the UE receives SSBs (having different indexes) which are broadcast and transmitted in a plurality of beam directions for initial access, if an SSB Rx beam of the UE and a PRACH or msgA Tx beam of the UE coincide (i.e., beam correspondence is established), the UE may perform D-LBT in the same Tx beam as the SSB beam Rx direction and, if D-LBT is successful, the UE may transmit the PRACH or msgA.

If the SSB Rx beam of the UE and the PRACH or msgA Tx beam of the UE do not coincide (i.e., beam correspondence is not established), the UE may perform O-LBT before transmitting the PRACH or msgA. This is because, since performing O-LBT means that beam correspondence is not established, performing transmission and D-LBT in a specific beam direction has no significant advantage to a meaningful degree as compared with performing transmission and O-LBT in all directions and if beam correspondence is not established, it is difficult for the UE to accurately determine a direction in which D-LBT is to be performed.

The UE for initial access may compare RSRPs of SSBs received in respective beam directions with an RSRP threshold configured by the BS and select an SSB having the RSRP threshold or higher as the best beam direction.

However, there may be a plurality of SSBs having the RSRP threshold or higher. Then, the UE may select one arbitrary SSB from among the SSBs having the RSRP threshold or higher. The UE may attempt to perform D-LBT in an RO and a beam direction associated with an SSB index of the selected SSB. Alternatively, the UE may attempt to sequentially perform D-LBT in descending order by configuring priorities starting from an SSB having the highest Rx strength or may attempt to perform D-LBT in directions corresponding to all ROs associated with all SSBs having the RSRP threshold or higher.

However, even when a single RSRP threshold is configured for the UE and a plurality of SSBs exceeding the RSRP threshold is present, if the UE arbitrarily selects only one SSB among the SSBs having the RSRP threshold or higher or selects an SSB having the largest Rx strength and attempts to perform D-LBT in an RO and a beam direction corresponding to the selected SSB, since there is a probability of failure of LBT, a channel access opportunity of the UE may be low. That is, a transmission opportunity of the PRACH or msgA of the UE may be relatively low.

Accordingly, as in (1) of Embodiment #1-3, the UE may attempt to perform D-LBT in respective beam directions corresponding to all ROs associated with all SSBs having the RSRP threshold or higher configured for the UE. The UE may transmit the PRACH or msgA in a beam direction in which D-LBT is successful, thereby increasing the channel access opportunity.

Alternatively, the UE may configure priorities in order of SSB Rx strength and attempt to sequentially perform D-LBT in ROs and beam directions starting from an RO and beam direction corresponding to an SSB having the highest priority (e.g., SSB having the largest RSRP) to an RO and beam direction corresponding to an RSRP having the lowest priority (e.g., SSB having the smallest RSRP). If related D-LBT all fails as a result of attempting to perform D-LBT in all ROs corresponding to SSBs having the RSRP threshold or higher according to 1) or 2) of (1) of Embodiment #1-3, the UE may reattempt to perform D-LBT again in ROs starting from an RO in which D-LBT has been attempted for the first time or switch to O-LBT to attempt to perform O-LBT. If LBT is successful, the UE may transmit the PRACH or msgA.

If a plurality of RSRP thresholds is configured, the UE may select one arbitrary SSB from among the SSBs having Th_1 or higher or select an SSB of the highest priority when priorities of the SSBs are configured according to Rx strength as in 1) or 2) of (2) of Embodiment #1-3. In this case, if the UE fails to perform D-LBT as a result of attempting to perform D-LBT only in an RO corresponding to the selected SSB, the UE may reselect an SSB of the next highest priority or an arbitrary SSB among SSBs except for the previously selected SSB and reattempt to perform D-LBT. The UE may transmit the PRACH or msgA in a beam direction in which D-LBT is successful.

When an SSB having Th_1 or more is not present and only an SSB having Th_2 or more is present, the UE may attempt to perform O-LBT in an RO corresponding to the SSB having Th_2 or more and, upon succeeding in performing O-LBT, the UE may transmit the PRACH or msgA.

Unlike initial access of the UE in an idle mode, the UE in the connected mode may transmit the PRACH or msgA based on CFRA triggered by scheduling (e.g., PDCCH order) of the BS. In this case, the UE may perform D-LBT upon an RO and dedicated preamble indicated to the UE to transmit the PRACH or msgA. In the case of CBRA as in the UE of the idle/inactive mode, the UE may always perform O-LBT.

Proposed Method #2

A method of configuring a UL LBT (failure) counter value in a process of performing D-LBT or O-LBT for UL transmission 1. Embodiment #2-1

The UE may manage and apply a UL LBT (failure) counter value with respect to each beam. For example, when D-LBT in a specific direction successively fails so that the counter value reaches a maximum value M1, the UE may reselect an LBT beam and reattempt to perform D-LBT again based on the reselected LBT beam. Here, the value M1 may be predefined in the standard or may be configured/indicated by the BS.

2. Embodiment #2-2

The UE may manage and apply the UL LBT (failure) counter value with respect to each beam. For example, when D-LBT in a specific direction successively fails so that the counter value reaches the maximum value, the UE may switch to O-LBT and attempt to perform O-LBT. The UE may transmit information indicating switching to O-LBT or fallback to O-LBT to the BS through a specific signal/channel. Here, the counter value of O-LBT and the counter value of D-LBT for each beam may be independently managed and applied.

(1) To inform the BS that the UE has switched to O-LBT, the UE may directly transmit related information through a PUSCH. Alternatively, the UE may inform the BS that the UE has switched to O-LBT by performing UL transmission using a prescheduled/preconfigured specific time-frequency resource. For example, when the UE switches to O-LBT, if the BS preconfigures a time-frequency resource to be used for the UE, the UE may perform first UL transmission on the corresponding time-frequency resource after switching to O-LBT.

3. Embodiment #2-3

The UE may perform the following procedures when the counter value reaches a maximum value M2 due to successive failure of D-LBT with respect to a plurality of beams while the UE performs the beam reselection operation as in Embodiment #2-1. In other words, when counter values of N beams all reach a value M1 or the sum of counter values of the beams reaches the value M2, the following procedures may be performed. Here, N and M2 may be predefined in the standard or may be configured/indicated by the BS.

(1) While the UE has performed an initial access procedure in an idle mode, the UE may perform cell reselection.

(2) When the UE has been in a connected mode and another configured UL BWP in addition to a current active UL BWP is present, the UE may switch to the other UL BWP from the active UL BWP.

Here, a single LBT beam in [Proposed Method #2] may be mapped to a plurality of UL Tx beams.

Hereinafter, [Proposed Method #2] will be described in detail.

In a U-band, the UE may not perform transmission due to successive failure of LBT. If the UE continues to fail to perform LBT, ambiguity may occur between the UE and the BS. Therefore, in Rel-16 NR-U, the UL LBT (failure) counter is configured and it has been regulated that a UL BWP is switched when the counter value reaches a specific maximum value by increasing the countervalue whenever UL LBT fails.

However, unlike 6-GHz NR-U in which only O-LBT is always performed, D-LBT and transmission and reception in a specific beam direction may also be supported in a high-frequency band over 52.6 GHz together with O-LBT. Therefore, when D-LBT is performed in the RACH procedure to transmit the PRACH or msgA, the UL LBT (failure) counter that has been managed for and applied to O-LBT may be defined with respect to each direction in which D-LBT is attempted and may be separately managed for and applied to each direction.

For example, the UL LBT (failure) counter value may be preconfigured with respect to a specific beam direction. For example, when as many counter values as the number of beam directions in which respective SSBs are transmitted are defined and the counter values are independently managed for respective beam directions, a counter value related to a corresponding direction may be applied (increased or decreased) whenever the UE attempts to perform D-LBT for transmission of the PRACH or msgA in an RO associated with each SSB.

If D-LBT performed in a specific beam direction fails continuously so that the counter value reaches the maximum value M1, the UE may select an SSB received in another beam direction and perform LBT beam reselection for reattempting to perform D-LBT in an RO corresponding to the selected SSB, unlike the case in which BWP switching is performed upon O-LBT in Rel-16 NR-U. In this case, the counter value of the reselected beam direction may be managed and applied independently of the counter value of the previous direction.

Here, the M1 value, which is the maximum value of the counter for each beam direction, is a value that may be predefined in the standard or configured/indicated by the BS. In addition, the M1 value may be differently configured for each beam direction. For example, a maximum value for a beam direction in which the RSRP threshold of the SSB is highest may be configured to be larger than maximum values for the other beam directions. In other words, the maximum value for each beam direction may be differently configured according to the RSRP threshold of the SSB and may be configured to be larger as the RSRP threshold of the SSB increases.

Alternatively, as in Embodiment #2-2, when the UL LBT (failure) counter value is managed for and applied to each beam and the counter value reaches the maximum value due to continuous failure of D-LBT in a specific beam direction, the UE may reattempt to perform LBT by switching from D-LBT to O-LBT. Here, the counter value of O-LBT may also be managed and applied independently of the counter value with respect to each beam of D-LBT.

In addition, the reason why O-LBT is performed is that performing transmission and D-LBT in a specific beam direction has no significant advantage to a meaningful degree as compared with performing transmission and O-LBT in all directions and it is difficult for the UE to accurately determine a direction in which D-LBT is to be performed due to continuous failure of D-LBT.

However, if LBT in a plurality of beam directions continuously fails, it is necessary to perform BWP switching as in the UL LBT failure procedure of legacy NR-U. Therefore, while the UE performs the beam reselection operation as in Embodiment #2-1, if the counter value reaches the M2 value due to continuous failure of D-LBT for a plurality of beams, UL BWP switching may be triggered according to a UL LBT failure procedure of Rel-16 NR-U. Meanwhile, the case in which the counter value reaches the M2 value may mean, for example, the case in which counter values of N beams all reach the M1 value or the sum of counter values of respective beams reaches the M2 value. In addition, the N value and the M2 value may be predefined in the standard or may be configured/indicated by the BS.

Proposed Method #3

A method of configuring/indicating an LBT beam for/to the UE of a connected mode will now be described.

1. Embodiment #3-1

When a UL Tx beam is configured for the UE, a configuration for the LBT beam may also be included together with the configuration for the UL Tx beam. For example, the BS may configure the UL Tx beam and the LBT beam for the UE through spatial relation information.

(1) If the configuration for the LBT beam is not included in configuration information such as the spatial relation information, the LBT beam may be configured to be the same as the UL Tx beam by default. For example, if beam correspondence is established between an Rx beam and a Tx beam of the UE, the BS may not include configuration information for the LBT beam and may include only configuration information for the UL Tx beam and transmit the configuration for the UL Tx beam to the UE. In other words, when beam correspondence is established between the Rx beam and the Tx beam of the UE, the BS may transmit only the configuration information for the UL Tx beam to the UE without separately transmitting the configuration information for the LBT beam.

In this case, the UE may configure the same beam as the UL Tx beam as the LBT beam and perform LBT based on the LBT beam.

For example, the configuration for the UL Tx beam transmitted by the BS may be transmission configuration indication (TCI) information or an SRS resource indicator (SRI), and the UE may configure the LBT beam of the same direction as a direction of the UL Tx beam obtained by the TCI information or the SRI.

(2) The LBT beam may be configured through signaling independent of the configuration for the UL Tx beam. For example, the LBT beam and the UL Tx beam may be separately configured through a higher-layer signal such as an RRC signal, a physical-layer signal such as downlink control information (DCI), or a specific signal/channel.

(1) of Embodiment #3-1 may be an exception to Embodiment #3-1. In other words, if beam correspondence of the UE is established, the UE may acquire a DL Rx beam based on the UL Tx beam even when only the UL Tx beam is configured for the UE. In this case, the same beam as the UL Tx beam may be used as the LBT beam. Therefore, if the BS recognizes that beam correspondence of the UE is established through the capability report of the UE, signaling overhead for configuring the LBT beam may be reduced by performing only the configuration for the UL Tx beam.

For example if the BS recognizes that beam correspondence of the UE is established, it is unnecessary to include the information for configuring the LBT beam in the spatial relation information or in a joint TCI state or it is unnecessary to include a configuration for an additional RS for indicating the LBT beam in an RS indicated by the spatial relation information or the joint TCI state. Therefore, since there is no need to perform transmission of an individual signal for indicating/configuring the LBT beam, a signaling bit size may be reduced. As another example, if the BS recognizes that beam correspondence of the UE is established, since there is no need to perform transmission of an individual signal for indicating/configuring the LBT beam, signaling overhead is reduced. Therethrough, the decoding complexity of the UE may be reduced. This is because, if the UE informs the BS that beam correspondence is established, the UE expects that only information about the UL Tx beam will be received and only needs to select the same beam as the UL Tx beam as the LBT beam.

2. Embodiment #3-2

LBT beams for specific beam directions may be preconfigured through a higher layer signal such as an RRC signal and, when a UL signal is scheduled for the UE, an LBT beam aligned with a UL Tx beam direction may be indicated. For example, a specific number of LBT beams, such as four beams obtained by dividing all directions into four, may be preconfigured. Among the four beams, an LBT beam that is aligned with a UL Tx beam indicated to/configured for the UE may be configured for/indicated to the UE by the BS. As another example, N LBT beams obtained by dividing all directions into N may be preconfigured for the UE. Among the N beams, the UE may perform LBT using an LBT beam that covers the UL Tx beam indicated to/configured for the UE.

3. Embodiment #3-3

An SSB-based beam rather than a channel state information reference signal (CSI-RS)-based beam may be configured by considering that a plurality of beams included in a CCA area may be multiplexed after the UE performs D-LBT using an LBT beam in a specific beam direction.

Here, a single LBT beam may be mapped to a plurality of UL Tx beams in [Proposed Method #3].

Hereinafter, [Proposed Method #3] will be described in detail.

A spatial relation with a reference RS for each of UL channels/signals such as a PUCCH/PUSCH/SRS may be configured through an information element (IE) such as the spatial relation information in a higher-layer signal such as an RRC signal for the UE of a connected mode performing UL transmission using a resource scheduled or configured by the BS.

In order to perform D-LBT in a U-band, a spatial relation with the LBT beam may also be configured along with a spatial relation with the reference RS for the UL Tx beam. The spatial relation with the LBT beam may be configured to be included in the same IE as the PUCCH/PUSCH/SRS. Alternatively, the spatial relation with the LBT beam may be configured through separate signaling (e.g., higher-layer signal or DCI) from the IE for the PUCCH/PUSCH/SRS.

When the spatial relation with the LBT beam is not configured through the same IE as the PUCCH/PUSCH/SRS or through individual signaling, the LBT beam may be configured to be the same as the UL Tx beam by default. That is, when the spatial relation with the LBT beam is not configured, the UE may select the same beam as the UL Tx beam as the LBT beam based on the spatial relation with the UL Tx beam.

For example, when the BS recognizes that beam correspondence of the UE is established through the capability report of the UE, the BS may not configure the spatial relation with the LBT beam for the UE. If the spatial relation with the LBT beam is not configured, the UE may configure the same beam as the UL Tx beam as the LBT beam.

Here, configuring the same beam as the UL Tx beam as the LBT beam means that the spatial relation with the reference RS configured for the UL Tx beam for each UL signal/channel is also applied to the LBT beam. For example, information related to the SRI or TCI configured for the UL Tx beam may be equally applied to the LBT beam.

When the LBT beam is configured through separate signaling from the UL Tx beam configuration, the LBT beam may be configured through a higher-layer signal such as an RRC signal, a physical-layer signal such as DCI, or a specific signal/channel.

Alternatively, the BS may preconfigure LBT beams for respective specific beam directions for the UE through a higher-layer signal such as an RRC signal and, when scheduling the UL signal for the UE, the BS may indicate an LBT beam aligned with the UL Tx beam direction. For example, four beams obtained by dividing all directions into four may be preconfigured through the higher-layer signal. The BS may indicate the direction of one beam among the four beams to the UE. As another example, N LBT beams obtained by dividing all directions into N may be preconfigured for the UE. Among the N beams, the UE may perform LBT using an LBT beam that covers the UL Tx beam indicated to/configured for the UE.

The beam width of a beam having a spatial relation with a specific reference RS may be relatively narrow compared to the beam width of a beam having a spatial relation with an SSB.

For example, the beam width configured through the SSB may be wider than the beam width configured through the specific RS such as a CSI-RS. An area affected by the direction of the UL Tx beam and transmission through the Tx beam may be desirably included in a CCA area using the LBT beam. That is, since the UL Tx beam outside the CCA area using the LBT beam may not be allowed, when the LBT beam is relatively narrow, it may be difficult to multiplex UL Tx beams of other directions outside the LBT beam through time division multiplexing (TDM) or spatial division multiplexing (SDM). Therefore, the BS may perform D-LBT using an LBT beam in a specific beam direction and then configure the LBT beam only based on the SSB rather than based on the CSI-RS by considering that a plurality of beams included in the CCA area may be multiplexed.

Proposed Method #4

Hereinafter, a method of increasing a channel access opportunity of the UE will be described.

1. Embodiment #4-1

When the LBT beam is configured for the UE by the BS, a plurality of LBT beams may be configured/indicated. For example, if the number of configured/indicated LBT beams is 2, a primary LBT beam and a secondary LBT beam may be configured/indicated according to priority.

(1) When the UE fails to perform D-LBT using the primary LBT beam, the UE may attempt to perform D-LBT a plurality of times through another preconfigured LBT beam (e.g., secondary LBT beam).

(2) When only one LBT beam (e.g., primary LBT beam) for performing D-LBT is configured for the UE, if the UE fails to perform D-LBT using the LBT beam, the UE may reattempt to perform LBT by fallback or switching to O-LBT.

In this case, only one LBT beam may be configured for the UE. When the UE fails to perform D-LBT using the LBT beam, the UE may perform O-LBT.

(3) If a channel is determined to be busy in M CCA slots in a backoff procedure while the UE performs D-LBT using the primary LBT beam, the UE may fall back/switch to the secondary LBT beam or O-LBT.

2. Embodiment #4-2

As a 2-step LBT method, when the primary LBT beam is a relatively wide beam (e.g., SSB-based LBT beam), and the secondary LBT beam is a relatively narrow beam (e.g., CSI-RS-based LBT beam), if the UE fails to perform D-LBT using the primary LBT beam, the UE may reattempt to perform D-LBT using the secondary LBT beam. In this case, the secondary LBT beam may be included in the primary LBT beam. That is, the primary LBT beam may be an LBT beam that covers the secondary LBT beam.

3. Embodiment #4-3

The BS may configure a plurality of candidate LBT beams for the UE. In this case, since simultaneously monitoring all of the plurality of candidate LBT beams may become a burden the BS, the UE may inform the BS of information about a specific LBT beam or a specific LBT beam direction which is actually used or will be used by the UE among the plurality of candidate LBT beams configured by the BS through a specific channel/signal.

(1) The specific channel/signal may be preconfigured/indicated by the BS. For example, the specific channel/signal may be a specific sequence mapped to each LBT beam or may be a UL channel/signal (e.g., an SRS or SR) transmitted on a preconfigured time-frequency resource.

4. Embodiment #4-4

When the LBT beam is preconfigured for the UE in association with a specific RS by the BS, if the Rx performance of the associated RS is degraded, the UE may attempt to perform D-LBT through another preconfigured LBT beam (e.g., another LBT beam associated with another RS). For example, when the primary LBT beam is configured in association with the SSB (or CSI-RS) and the secondary LBT beam is associated with the CSI-RS (or SSB), if the Rx performance of the SSB (or CSI-RS) is reduced, the UE may attempt to perform D-LBT using the secondary LBT beam.

As another example, when the primary LBT beam is associated with a first CSI-RS (or first SSB), and the secondary LBT beam is associated with a second CSI-RS (or second SSB), if the Rx performance of the first CSI-RS (or first SSB) is reduced, the UE may attempt to perform D-LBT using the secondary LBT beam.

In the above case, the beam width of the LBT beam associated with the SSB may be wider than the beam width of the LBT beam associated with the CSI-RS. In addition, the beam width of the LBT beam associated with the first CSI-RS (or first SSB) may be wider than the LBT beam associated with the second CSI-RS (or second SSB). However, on the contrary, the beam width of the LBT beam associated with the first CSI-RS (or first SSB) may be narrower than the beam width of the LBT beam associated with the second CSI-RS (or second SSB).

In addition, the primary LBT beam and the secondary LBT beam may be LBT beams for different directions. In contrast, any one of the primary LBT beam and the secondary LBT beam may cover the other LBT beam.

Hereinafter, [Proposed Method #4] will be described in detail.

LBT for transmission in the U-band always has a probability of failure. In particular, if there is continuous interference in a specific beam direction, LBT may repeatedly fail. In this case, if the UE continuously attempts to perform LBT using the same LBT beam, since the UE may not transmit a scheduled UL signal/channel until LBT is successful, ambiguity may occur from the viewpoint of the BS as to whether the UE has not received UL scheduling or has failed to perform LBT.

Therefore, in consideration of the possibility of continuous LBT failure in a specific beam direction, a plurality of LBT beams may be configured when an LBT beam is configured for the first time.

The BS may configure a plurality of LBT beams for the UE. For example, a specific beam direction may be configured as the primary LBT beam. For example, a beam direction having the best Rx sensitivity of an RS with which the LBT beam has a spatial relation may be configured as the primary LBT beam.

A secondary LBT beam and/or a third LBT beam may also be configured for the UE according to the number of configured candidate LBT beams and Rx sensitivity of the RS. In this case, when the UE fails to perform D-LBT using the primary LBT beam, the UE may attempt to perform LBT a plurality of times through other preconfigured LBT beams. For example, when the BS simultaneously indicates LBT beams 1, 2, and 3 to the UE and S=k is indicated as a start and length indicator value (SLIV), the UE may attempt to perform D-LBT using beam 1 in the k-th symbol. If D-LBT based on beam 1 fails, the UE may attempt to perform D-LBT using beam 2 in the k+1 symbol and, if D-LBT using beam 2 also fails, the UE may reattempt to perform D-LBT using beam 3 in the k+2 symbol, thereby increasing a channel access opportunity.

This is because, since fallback to O-LBT means that beam correspondence is not established, performing transmission and D-LBT in a specific beam direction has no significant advantage to a meaningful degree as compared with performing transmission and LBT in all directions and it is difficult for the UE to accurately determine a direction in which D-LBT is to be performed.

Alternatively, as a 2-step method, the UE may perform D-LBT based on a relatively wide beam as the primary LBT beam and, upon failing to perform D-LBT, the UE may reattempt to perform D-LBT using the secondary LBT beam which is a narrow beam included in the primary LBT beam, thereby increasing the channel access opportunity.

In this case, an area affected by the direction of the Tx beam and transmission through the Tx beam should be included in a CCA area using the LBT beam. When performing D-LBT through the wide beam and performing D-LBT through the narrow beam, ED thresholds may be differently configured.

As described above, when a plurality of candidate LBT beams is configured, simultaneously monitoring all of the plurality of configured candidate LBT beams may become a burden to the BS. Therefore, the UE may select a beam direction of a candidate LBT beam having the best Rx sensitivity of the RS among the candidate LBT beams configured for the UE as the LBT beam and inform the BS of the selected LBT beam or the beam direction of the candidate LBT beam through a specific channel/signal. The specific channel/signal may be a specific sequence previously mapped to each LBT beam or may be a UL channel/signal (e.g., an SRS or SR) transmitted on a preconfigured time-frequency resource.

When the Rx performance of an associated RS is degraded based on a preconfiguration of the LBT beam associated with a specific RS by the BS, the UE may attempt to perform D-LBT after switching to another preconfigured LBT beam (e.g., another LBT beam preassociated with another RS).

Proposed Method #5

The BS may configure/indicate a channel access mode for each RACH-related signal/channel or each RO through cell-common signaling, UE-specific signaling, or a combination thereof.

1. Embodiment #5-1

The BS may configure/indicate that a no-LBT mode is applicable to all or a part of RACH-related signals/channels through cell-common signaling (e.g., SIB 1).

(1) The BS may configure for/indicate to only one or more specific UEs that the no-LBT mode is applicable to all or a part of the RACH-related signals/channels through UE-specific signaling (e.g., dedicated RRC signaling).

2. Embodiment #5-2

The BS may configure/indicate that a no-LBT mode is applicable to all or a part of the RACH-related signals/channels transmitted in a specific RO through cell-common signaling (e.g., SIB1).

(1) The BS may configure for/indicate to only one or more specific UEs that the no-LBT mode is applicable to all or part of the RACH-related signals/channels transmitted in a specific RO through UE-specific signaling (e.g., dedicated RRC signaling).

In the above description, (1) of Embodiment #5-1 and (1) of Embodiment #5-2 may be applied to an active BWP other than an initial BWP after initial access. A constraint condition of a duty cycle may be configured/indicated for signals/channels transmitted based on the no-LBT mode. Alternatively, if the constraint condition of the duty cycle for signals/channels transmitted based on an O-LBT mode is previously indicated, (1) of Embodiment #5-1 and (1) of Embodiment #5-2 may be applied to signals/channels satisfying the condition of the duty cycle by determining whether the no-LBT mode is applied based on the condition of the duty cycle defined by determination of the UE even without an additional indication/configuration.

Hereinafter, [Proposed Method #5] will be described in detail.

It may be necessary to perform an appropriate spectrum sharing mechanism (e.g., LBT) before transmission for fair coexistence between different RATs in a U-band. However, this spectrum sharing mechanism may or may not be mandatory for each region/country regulation requirement. Therefore, in a specific region/country, the no-LBT mode for performing transmission without LBT according to regulation may be applicable.

In particular, since the RACH-related signals/channels are essential signals/channels for first cell access or synchronization, if LBT is always applied before transmission, several disadvantages such as delay of cell access due to decrease of the channel access opportunity of the UE may occur.

Therefore, in a region/country in which the spectrum sharing mechanism such as LBT is not mandatory in regulation, the no-LBT mode that may access the channel without LBT before transmission may be useful. In particular, the no-LBT mode may be beneficial for the RACH-related signals/channels. Additionally, in order to prevent the occurrence of congestion situations such as frequent transmission collision when high-density UEs in the cell always perform transmission using the no-LBT mode, the constraint condition of the duty cycle for limiting the ratio of time occupied by signals transmitted in the no-LBT mode within a specific duration may be needed.

The UEs for initial access receive information about a corresponding cell and an RACH configuration through cell-common signaling broadcast by the BS and perform an RACH procedure based on the received information about the cell and the received RACH configuration. In this case, the BS may indicate that the no-LBT mode may be applied to a part or all of the RACH-related signals/channels through cell-common signaling such as SIB1 based on regulation. Upon receiving information about application of the no-LBT mode, the UE may not perform LBT on signals/channels to which the no-LBT mode is applicable among the RACH-related signals/channels (e.g., Msg1, Msg3, and MsgA), thereby rapidly performing transmission. Whether the no-LBT mode is applicable to Msg3 may be included in Msg2 that schedules Msg3.

The signals/channels related to the RACH procedure are important signals/channels used when synchronization between the BS and the UE is misaligned as well as when initial access is performed.

Accordingly, when each UE receives an RACH configuration for an active BWP other than an initial BWP through dedicated RRC signaling after initial access, the signals/channels to which no-LBT may be applied may also be configured/indicated. The UE may immediately perform transmission without LBT with respect to all or a part of the RACH-related signals/channels to which no-LBT is applied based on the information as to whether no-LBT is applied.

RO-related information may be included in the information that is cell-commonly broadcast by the BS for the UEs for initial access. In this case, whether no-LBT is applicable may be configured for each RO. For example, if a total of N ROs is configured in an RACH slot in the time domain, the no-LBT mode may be applied to the foremost RO, the rearmost RO, or even-numbered/odd-numbered ROs among the N ROs, so that signals/channels transmitted in corresponding ROs may be configured to be transmitted without performing LBT.

Alternatively, when a total of M ROs is present in the frequency domain, an RACH-related signal/channel may be configured to be transmitted without performing LBT in an RO of a specific band or an RO of a specific order.

As described above, since the signals/channels related to the RACH procedure are not always used only for initial access, the no-LBT mode may be UE-specifically configured for/indicated to each UE to be applied to a signal/channel transmitted in a specific RO through dedicated RRC signaling.

If there are high-density UEs in a cell so that collision between signals transmitted in the no-LBT mode frequently occurs, retransmission is required a lot and efficiency may be reduced. Therefore, the constraint condition such as the duty cycle may be additionally imposed on the signals/channels transmitted in the no-LBT mode.

Alternatively, if the duty cycle restriction condition is preconfigured, the UE may determine whether to apply no-LBT under the determination of the UE without an additional indication/configuration and apply no-LBT to signals/channels satisfying the restriction condition. For example, a time occupied by the signals/channels transmitted in the no-LBT mode in an observation period of 100 ms may be configured/indicated by the BS not to exceed 10 ms. Alternatively, the duty cycle restriction condition is preconfigured and signals/channels satisfying the condition may be configured for/indicated to the UE to perform transmission without LBT.

The above description of the present disclosure is not limited only to device-to-device communication and may be used on UL or DL. In this case, the BS or a relay node may use the above proposed methods.

Since examples of the above-described proposed methods may be included in one of implementation methods of the present disclosure, it is obvious that the examples may be regarded as proposed methods. Although the above-described proposed methods may be independently implemented, the proposed methods may be implemented in a combined (integrated) form of parts of the proposed methods. A rule may be defined such that information as to whether the proposed methods are applied (or information about rules of the proposed methods) is indicated by the BS to the UE or by the Tx UE to the Rx UE through a predefined signal (e.g., a physical-layer signal or a higher-layer signal).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 28:
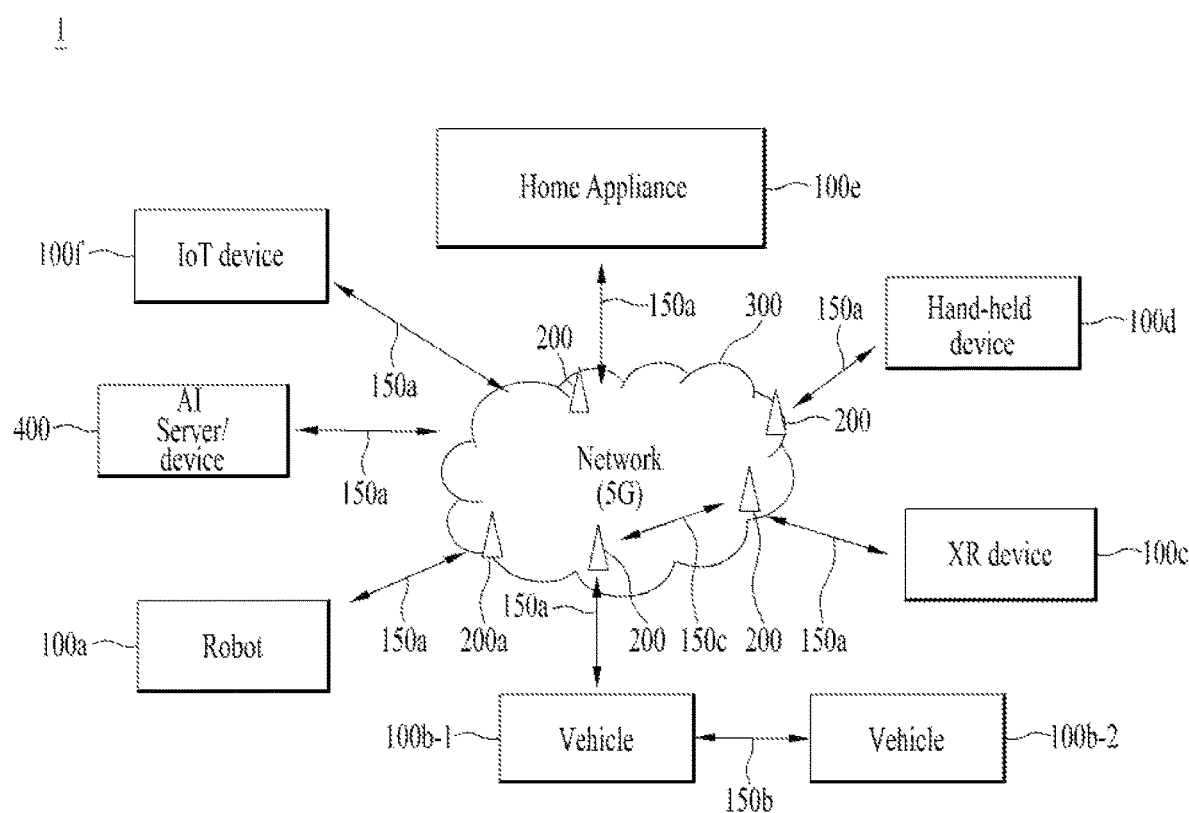
FIG. 28 illustrates an exemplary communication system applied to the present disclosure.

FIG. 28 illustrates a communication system 1 applied to the present disclosure.

Referring to FIG. 28, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 29:
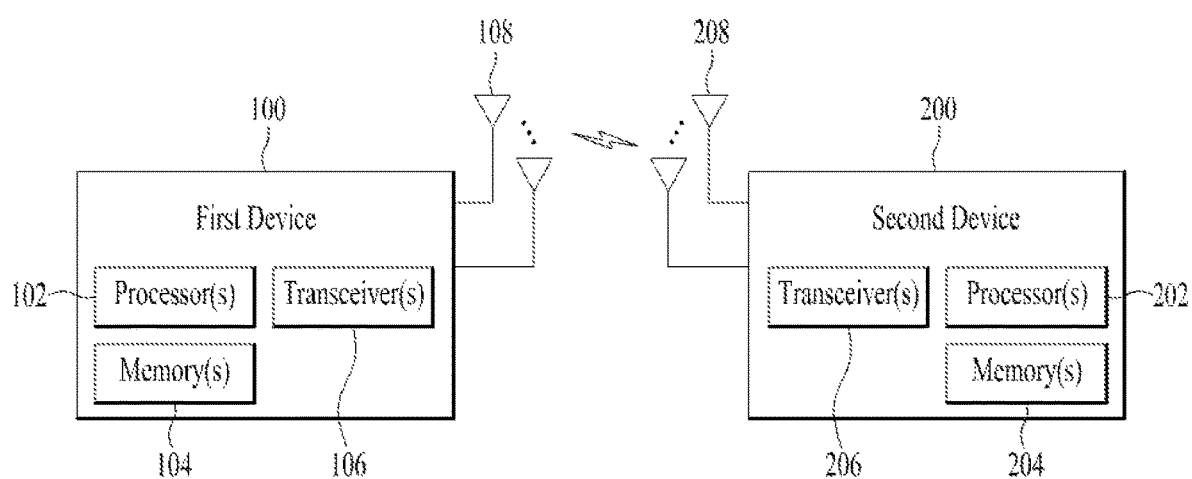
FIG. 29 illustrates an exemplary wireless device applicable to the present disclosure.

FIG. 29 illustrates wireless devices applicable to the present disclosure.

Referring to FIG. 29, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will now be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to embodiments or implementations of the present disclosure, related to the following operations.

Specifically, the processor 102 may control the transceiver 106 to receive information related to LBT from the BS. The information related to LBT and a detailed method of receiving the information may be based on at least one of [Proposed Method #1], [Proposed Method #3], or [Proposed Method #5].

The processor 102 may perform LBT for transmitting a UL signal based on the received information. If a channel is determined to be idle through LBT, the processor 102 may control the transceiver 106 to transmit the UL signal. A detailed method in which the processor 102 controls the transceiver 106 to transmit the UL signal by performing LBT may be based on at least one of [Proposed Method #1], [Proposed Method #2], or [Proposed Method #4].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 and stored in the memory 204 of the second wireless device 200, according to an embodiment of the present disclosure will now be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

Specifically, the processor 202 may control the transceiver 106 to transmit information related to LBT to the UE. The information related to LBT and a detailed method of receiving the information may be based on at least one of [Proposed Method #1], [Proposed Method #3], or [Proposed Method #5].

The processor 202 may control the transceiver 206 to receive a UL signal from the UE. The received UL signal may be transmitted based on at least one of [Proposed Method #1], [Proposed Method #2], or [Proposed Method #4].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 30:
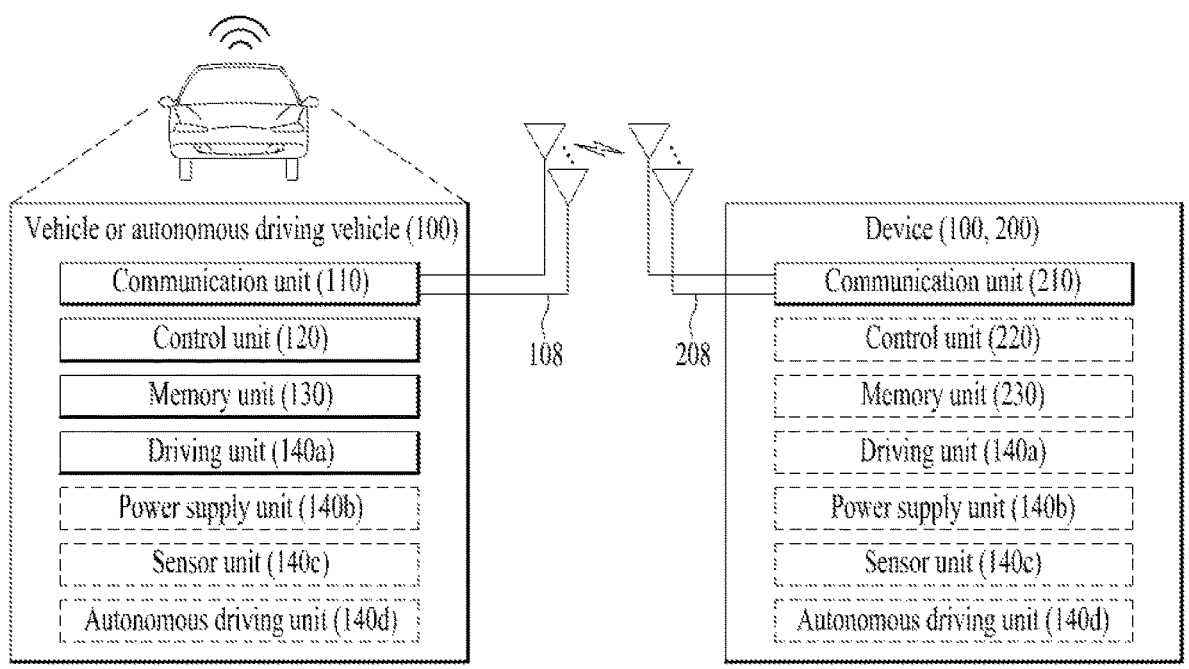
FIG. 30 illustrates an exemplary vehicle or autonomous driving vehicle applicable to the present disclosure.

FIG. 30 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 30, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of performing a CAP and the apparatus therefor have been described based on an example applied to a 5G NR system, the method and apparatus are applicable to various wireless communication systems in addition to the 5G NR system.

What is claimed is:

1. A method of transmitting an uplink signal by a user equipment (UE) in a wireless communication system, the method comprising:
   receiving first information related to an uplink (UL) transmission beam;
   determining a beam for a Channel Access Procedure (CAP) based on the first information; and
   transmitting the uplink signal through the UL transmission beam based on success of the CAP based on the beam for the CAP,
   wherein, based on the UE indicating a beam correspondence without beam sweeping, the beam for the CAP is determined to be the same as the UL transmission beam.

2. The method of claim 1, wherein, based on the UE not indicating the beam correspondence without beam sweeping, the beam for the CAP is determined to cover the UL transmission beam.

3. The method of claim 1, wherein the beam for the CAP is redetermined based on failure of the CAP performed M1 times, M1 being a positive integer.

4. The method of claim 3, wherein a UL bandwidth part (BWP) is switched based on failure of the CAP performed M1 times based on the redetermined beam for the CAP.

5. A user equipment (UE) for transmitting an uplink signal in a wireless communication system, the UE comprising:
   at least one transceiver;
   at least one processor; and at least one memory operably connected to the at least one processor and configured to store instructions causing, when executed, the at least one processor to perform operations comprising:

receiving, through the at least one transceiver, first information related to an uplink (UL) transmission beam, determining a beam for a Channel Access Procedure (CAP) based on the first information, and transmitting, through the at least one transceiver, the uplink signal through the UL transmission beam based on success of the CAP based on the beam for the CAP, wherein, based on the UE indicating a beam correspondence without beam sweeping, the beam for the CAP is determined to be the same as the UL transmission beam.

6. The UE of claim 5, wherein, based on an absence of indication for the support of beam correspondence without beam sweeping by the UE, the beam for the CAP is determined to cover the UL transmission beam.

7. The UE of claim 5, wherein the beam for the CAP is redetermined based on failure of the CAP performed M1 times, M1 being a positive integer.

8. The UE of claim 7, wherein a UL bandwidth part (BWP) is switched based on failure of the CAP performed M1 times based on the redetermined beam for the CAP.

9. A method of receiving an uplink signal by a base station (BS) in a wireless communication system, the method comprising:

transmitting, to a user equipment (UE), first information related to an uplink (UL) transmission beam; and receiving the uplink signal through the UL transmission beam from the UE, wherein the UL signal is received based on a channel for a channel access procedure (CAP) on a sensing beam being sensed to be idle, and wherein, based on the UE indicating a beam correspondence without beam sweeping, the sensing beam is selected the same as the transmission beam.

10. A non-transitory medium which is readable by a processor and storing instructions cause a processor to perform the method of claim 1.

* * * * *